US012603053B2

(12) United States Patent
Kwon et al.

(10) Patent No.: US 12,603,053 B2
(45) Date of Patent: Apr. 14, 2026

(54) PIXEL CIRCUITS AND DISPLAY DEVICE USING THE SAME

(71) Applicant: LG Display Co., Ltd., Seoul (KR)

(72) Inventors: Ki Tae Kwon, Paju-si (KR); Yong Won Jo, Paju-si (KR); Jong Wook Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/990,316

(22) Filed: Dec. 20, 2024

(65) Prior Publication Data

US 2025/0218377 A1 Jul. 3, 2025

(30) Foreign Application Priority Data

Dec. 29, 2023 (KR) ........................ 10-2023-0197312

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); *G09G 2300/0842* (2013.01); *G09G 2310/027* (2013.01); *G09G 2310/0297* (2013.01); *G09G 2310/08* (2013.01); *G09G 2320/045* (2013.01); *G09G 2330/021* (2013.01)

(58) Field of Classification Search
CPC ............................................. G09G 3/30–3291
See application file for complete search history.

(56) References Cited

U.S. PATENT DOCUMENTS

2015/0008405 A1* 1/2015 Kim ..................... G09G 3/3291 257/40
2021/0043149 A1* 2/2021 Yoo ...................... G09G 3/3291
2021/0201831 A1* 7/2021 Woo ..................... G09G 3/3291
2024/0321182 A1* 9/2024 Kim ..................... G09G 3/3225

FOREIGN PATENT DOCUMENTS

KR 10-2020-0011165 A 2/2020
KR 10-2021-0009713 A 1/2021
KR 10-2023-0082766 A 6/2023

* cited by examiner

*Primary Examiner* — Nitin Patel
(74) *Attorney, Agent, or Firm* — Birch, Stewart, Kolasch & Birch, LLP

(57) ABSTRACT

A pixel circuit can include an internal compensation unit having a driving transistor and a capacitor having a first terminal connected to a gate electrode of the driving transistor. Data lines are connected to a first electrode of the driving transistor and a second terminal of the capacitor, respectively, so that a light-emitting element emits light with a grayscale corresponding to a difference between data voltages charged in the capacitor. Accordingly, the number of bits of data output from channels of a data driving circuit can be reduced.

14 Claims, 21 Drawing Sheets

| GRAYSCALE | DATA2 | DATA1 |
|---|---|---|
| 0G~255G | 255G | 0G ~ 15G |
| | 239G | 0G ~ 15G |
| | 223G | 0G ~ 15G |
| | 207G | 0G ~ 15G |
| | 191G | 0G ~ 15G |
| | 175G | 0G ~ 15G |
| | 159G | 0G ~ 15G |
| | 143G | 0G ~ 15G |
| | 127G | 0G ~ 15G |
| | 111G | 0G ~ 15G |
| | 95G | 0G ~ 15G |
| | 79G | 0G ~ 15G |
| | 63G | 0G ~ 15G |
| | 47G | 0G ~ 15G |
| | 31G | 0G ~ 15G |
| | 15G | 0G ~ 15G |

| ITEM | GRAYSCALE | VOLTAGE(V) |
|---|---|---|
| DATA2 (UPPER 4 BITS) | 255G | 1.00V |
| | 239G | 1.16V |
| | 223G | 1.32V |
| | : | : |
| | 47G | 3.18V |
| | 31G | 3.34V |
| | 15G | 3.50V |
| DATA1 (LOWER 4 BITS) | 15G | 3.50V |
| | 14G | 3.51V |
| | 13G | 3.52V |
| | : | : |
| | 2G | 3.53V |
| | 1G | 3.54V |
| | 0G | 3.55V |

PRIOR ART

PRIOR ART

FIG. 10

| GRAYSCALE | DATA2 | DATA1 |
|---|---|---|
| 0G~255G | 255G | 0G ~ 15G |
| | 239G | 0G ~ 15G |
| | 223G | 0G ~ 15G |
| | 207G | 0G ~ 15G |
| | 191G | 0G ~ 15G |
| | 175G | 0G ~ 15G |
| | 159G | 0G ~ 15G |
| | 143G | 0G ~ 15G |
| | 127G | 0G ~ 15G |
| | 111G | 0G ~ 15G |
| | 95G | 0G ~ 15G |
| | 79G | 0G ~ 15G |
| | 63G | 0G ~ 15G |
| | 47G | 0G ~ 15G |
| | 31G | 0G ~ 15G |
| | 15G | 0G ~ 15G |

| ITEM | GRAYSCALE | VOLTAGE(V) |
|---|---|---|
| DATA2 (UPPER 4 BITS) | 255G | 1.00V |
| | 239G | 1.16V |
| | 223G | 1.32V |
| | ⋮ | ⋮ |
| | 47G | 3.18V |
| | 31G | 3.34V |
| | 15G | 3.50V |
| DATA1 (LOWER 4 BITS) | 15G | 3.50V |
| | 14G | 3.51V |
| | 13G | 3.52V |
| | ⋮ | ⋮ |
| | 2G | 3.53V |
| | 1G | 3.54V |
| | 0G | 3.55V |

PIXEL CIRCUITS AND DISPLAY DEVICE USING THE SAME

CROSS-REFERENCE TO RELATED APPLICATION

This application claims priority to Korean Patent Application No. 10-2023-0197312, filed in the Republic of Korea on Dec. 29, 2023, the entire disclosure of which is hereby expressly incorporated by reference into the present application.

BACKGROUND

1. Field

The present disclosure relates to a pixel circuit and a display device using the same, and more particularly, to a pixel circuit that expresses a light emission grayscale by applying a data voltage to both ends of a capacitor of an internal compensation circuit through dual data lines, and a display device using the same.

2. Discussion of the Related Art

With the development of information technology, many related technologies have been developed in the field of display devices for presenting visual information through videos or images. The display device includes a display panel including a plurality of sub-pixels, a driving circuit configured to supply a signal for driving the display panel, a power supply unit configured to supply power to the display panel, and the like. The driving circuit includes a gate driving circuit and a data driving circuit configured to supply a gate signal and a data signal to the display panel, respectively.

Meanwhile, in the display device, a data voltage is applied to a gate electrode of a driving transistor for a relatively long period of time during which a light-emitting element emits light to display a grayscale, and thus the driving transistor remains continuously in a turned-on state, and can be degraded by such a long period of turn-on operation. For example, since the data voltage of the same polarity is applied to the gate electrode of the driving transistor for a long period of time, interface characteristics between the gate electrode of the driving transistor and a gate insulating layer can deteriorate, causing a threshold voltage of the driving transistor to change, which in turn can change a light emission grayscale of the light-emitting element and degrade image display quality. In order to compensate for the change in the threshold voltage of the driving transistor, an internal compensation pixel structure is proposed that stores a current threshold voltage in a storage capacitor, which is then added to the data voltage.

In a general internal compensation pixel structure, through one data line, a pixel driving voltage (i.e., a high potential voltage) is applied to one electrode of the storage capacitor during a sampling period for detecting the threshold voltage, and a data voltage is applied to an opposite electrode of the storage capacitor through one data line. In this way, in order for a sub-pixel to express grayscales with a predetermined number of bits (e.g., 8 bits), each of data output channels of the data driving circuit should be able to output data having the predetermined number of bits (i.e., 8 bits).

SUMMARY OF THE DISCLOSURE

The present disclosure is directed to providing a pixel circuit capable of reducing the number of bits of data output from channels of a data driving circuit, and a display device using the same.

The present disclosure is also directed to providing a pixel circuit in which a data voltage is applied to both ends of a capacitor of an internal compensation circuit through dual data lines to store a potential difference between the data lines in the capacitor, and a light-emitting element emits light with a grayscale corresponding to the stored voltage.

The present disclosure is also directed to providing a display device that uses a method in which one gate line and two data lines are connected to one sub-pixel, wherein the data lines are shared through a demultiplexer, and time-division driving is applied.

Objectives of the present disclosure are not limited to the above-described objectives, and other objectives that are not described herein will be apparently understood by those skilled in the art from the following description.

According to an aspect of the present invention, there is provided a pixel circuit including a light-emitting element, a driving transistor electrically connected to the light-emitting element through a second electrode thereof to supply a current to the light-emitting element, and controlled by a voltage applied to a gate electrode thereof, a capacitor having a first terminal connected to the gate electrode of the driving transistor, and an internal compensation unit including a plurality of switch elements to sense a threshold voltage of the driving transistor during a sampling period and supply a current, in which the threshold voltage is compensated for, to the light-emitting element, wherein a data line, through which an analog data voltage converted from a digital data signal is supplied, is connected to the internal compensation unit, wherein a light emission grayscale of the light-emitting element is adjusted based on the number of bits of the digital data signal, the data line includes a first data line and a second data line, wherein the first data line is electrically connected to a first electrode of the driving transistor, and the second data line is electrically connected to a second terminal of the capacitor, and a difference between a voltage of the second data line and a voltage of the first data line is charged to a first voltage in the capacitor during the sampling period, so that the light-emitting element emits light with a grayscale corresponding to the first voltage.

According to another aspect of the present invention, there is provided a display device including a display panel in which a plurality of data lines and a plurality of gate lines cross each other and pixels are disposed, a data driver configured to convert a digital data signal into an analog data voltage and supply the analog data voltage to the data lines, a gate driver configured to supply a gate signal to the gate lines, a timing controller configure to transmit the digital data signal to the data driver and generate a signal for controlling operation timings of the data driver and the gate driver, and a power supply unit configured to generate voltages required for driving the pixels, the data driver, the gate driver, and the timing controller, wherein each of the pixels includes sub-pixels each having a pixel circuit, the pixel circuit includes a light-emitting element, a driving transistor electrically connected to the light-emitting element through a second electrode thereof to supply a current to the light-emitting element, and controlled by a voltage applied to a gate electrode thereof, a capacitor having a first terminal connected to the gate electrode of the driving transistor, and an internal compensation unit including a plurality of switch elements to sense a threshold voltage of the driving transistor during a sampling period and supply a current, in which the threshold voltage is compensated for, to the light-emitting element, the internal compensation unit is connected to the data line and adjusts a light emission grayscale of the light-emitting element based on the number of bits of the digital data signal, the data line connected to the internal compensation unit includes a first data line and a second data line, wherein the first data line is electrically connected to a first electrode of the driving transistor, and the second data line is electrically connected to a second terminal of the capacitor, and a difference between a voltage of the second data line and a voltage of the first data line is charged to a first voltage in the capacitor during the sampling period, so that the light-emitting element emits light with a grayscale corresponding to the first voltage.

According to still another aspect of the present invention, there is provided a display device including a display panel in which a plurality of data lines and a plurality of gate lines cross each other and pixels are disposed, a data driver configured to convert a digital data signal into an analog data voltage and supply the analog data voltage to the data lines, and a demultiplexing unit configured to distribute the data voltage converted from the digital data signal by the data driver to the data lines, wherein each of the pixels includes sub-pixels each having a pixel circuit, one of the gate lines and two of the data lines are connected to each of the sub-pixels, the two data lines connected to each of the sub-pixels include a data line to which one of voltages obtained by being divided and converted from the digital data signal is supplied through one channel of the data driver, and a data line to which the other one of the voltages is supplied through another channel of the data driver by being distributed by the demultiplexing unit, and the pixel circuit includes a light-emitting element, a driving transistor electrically connected to the light-emitting element through a second electrode thereof to supply a current to the light-emitting element, and controlled by a voltage applied to a gate electrode thereof, a capacitor having a first terminal connected to the gate electrode of the driving transistor, and an internal compensation unit including a plurality of switch elements to sense a threshold voltage of the driving transistor during a sampling period and supply a current, in which the threshold voltage is compensated for, to the light-emitting element, a first data line and a second data line, which are the two data lines connected to each of the sub-pixels, are connected to the internal compensation unit to adjust a light emission grayscale of the light-emitting element based on the number of bits of the digital data signal, wherein the first data line is electrically connected to a first electrode of the driving transistor, and the second data line is electrically connected to a second terminal of the capacitor, and a difference between a voltage of the second data line and a voltage of the first data line is charged to a first voltage in the capacitor during the sampling period, so that the light-emitting element emits light with a grayscale corresponding to the first voltage.

Details of other embodiments are incorporated in the detailed description and the drawings.

BRIEF DESCRIPTION OF THE DRAWINGS

The above and other objects, features, and advantages of the present invention will become more apparent to those of ordinary skill in the art by describing example embodiments thereof in detail with reference to the accompanying drawings, in which:

FIG. 10 is a table illustrating a method of expressing grayscales of the sub-pixel and example data voltage values according to one or more embodiments of the present disclosure;

DETAILED DESCRIPTION OF THE EMBODIMENTS

Figure 1:
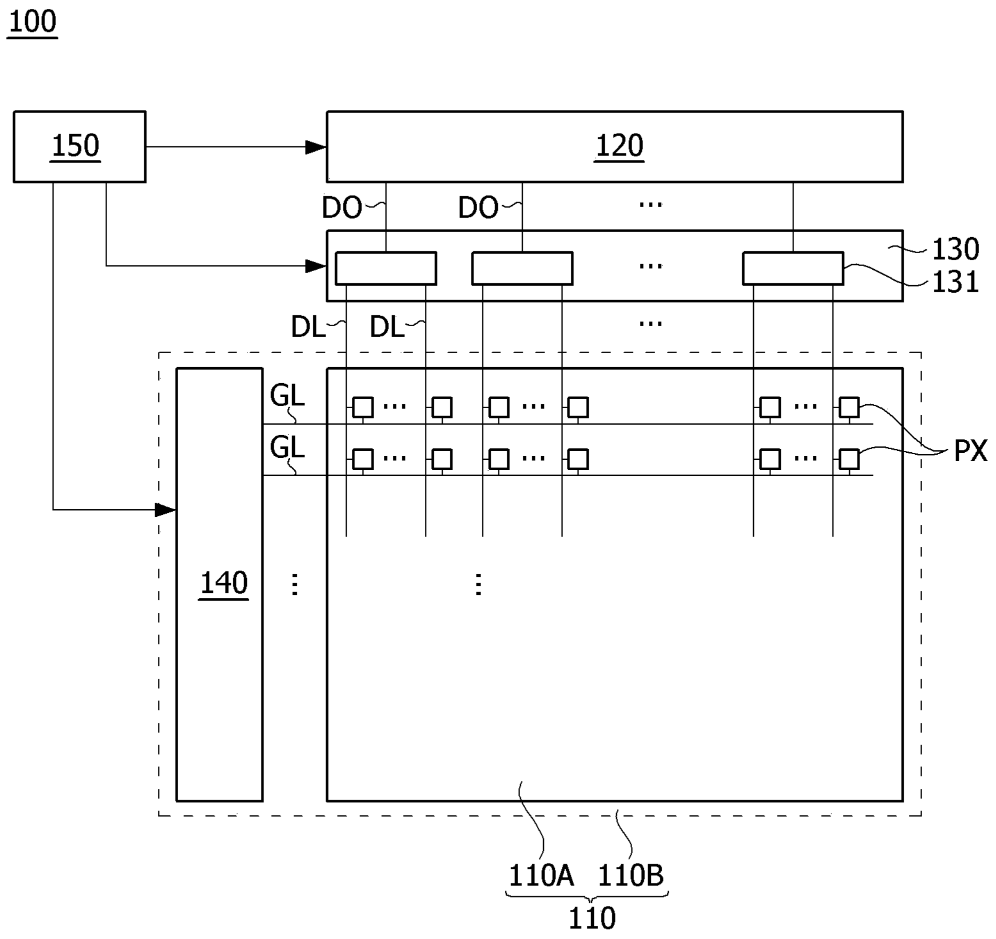
FIG. 1 is a block diagram schematically illustrating a display device according to one or more embodiments of the present disclosure.

Advantages and features of the present invention, and implementation methods thereof will be clarified through the following embodiments described with reference to the accompanying drawings. However, the present invention is not limited to embodiments disclosed below and is implemented in various other forms. The present embodiments make the disclosure of the present invention complete and are provided to completely inform one of ordinary skill in the art to which the present invention pertains of the scope of the disclosure.

The figures, dimensions, ratios, angles, numbers, and the like disclosed in the drawings for describing the embodiments of the present invention are merely illustrative and are not limited to details shown in the present invention. Like reference numerals refer to like elements throughout. Further, in describing the present invention, detailed descriptions of well-known technologies will be omitted when it is determined that they can unnecessarily obscure the gist of the present invention. Terms such as "including," "having," and "composed of" used herein are intended to allow other elements to be added unless the terms are used with the term "only." Any references to the singular can include the plural unless expressly stated otherwise. Further, the term "can" fully encompasses all the meanings and coverages of the term "may."

Components are interpreted as including an ordinary error range even if not expressly stated.

For the description of a positional relationship, for example, when the positional relationship between two parts is described as "on," "above," "below," "next to," and the like, one or more parts can be interposed therebetween unless the term "immediately" or "directly" is used in the expression.

For the description of a temporal relationship, for example, when a temporal relationship is described as "after," "subsequently to," "next," "before," and the like, a non-consecutive case can be included unless the term "immediately" or "directly" is used in the expression.

The features of various embodiments of the present disclosure can be partially or entirely bonded to or combined with each other. The embodiments can be interoperated and performed in various ways technically and can be carried out independently of or in association with each other.

In a display device of the present disclosure, a driving circuit, a gate driving circuit, and the like formed on a substrate of a display panel can include transistors. The transistors can be implemented as oxide thin-film transistors (TFTs) including an oxide semiconductor, low-temperature polysilicon (LTPS) TFTs including LTPS, and the like. Each of the transistors can be implemented as an n-channel or p-channel transistor (i.e., an n-type or p-type transistor). For example, the transistors can be implemented as transistors having a metal-oxide-semiconductor field-effect transistor (MOSFET) structure. The transistors are three-electrode elements including a gate, a source, and a drain. The source is an electrode that provides carriers to the transistor. In the transistor, the carriers move from the source to the drain. In the case of an n-channel transistor, the carriers are electrons. Thus, the electrons move from the source to the drain, and a source voltage is lower than a drain voltage. In the n-channel transistor, the direction of current is from the drain to the source because the electrons move from the source to the drain. In the case of a p-channel transistor, the carriers are holes. Thus, the source voltage is higher than the drain voltage so that the holes can move from the source to the drain. The direction of current is from the source to the drain because the holes of the p-channel transistor move from the source to the drain. The source and drain of the transistor are not fixed, and the source and drain of the transistor can be changed according to an applied voltage.

Hereinafter, a gate-on voltage can be a voltage of a gate signal which can turn the transistor on. A gate-off voltage can be a voltage that can turn the transistor off. In the p-channel transistor, a turn-on voltage can be a gate low voltage, and a turn-off voltage can be a gate high voltage. In the n-channel transistor, a gate-on voltage can be a gate high voltage, and a gate-off voltage can be a gate low voltage.

Hereinafter, a pixel circuit and a display device using the same according to the embodiment of the present disclosure will be described with reference to the accompanying drawings. All the components of each display device according to all embodiments of the present disclosure are operatively coupled and configured.

FIG. 1 is a block diagram schematically illustrating a display device according to one embodiment of the present disclosure.

Referring to FIG. 1, a display device 100 includes a display panel 110, a data driver 120, a demultiplexing unit 130, a gate driver 140, a timing controller 150, and a power supply unit.

The display panel 110 is a component that displays an image. The display panel 110 can be implemented as a display panel used in various display devices such as a liquid-crystal display device, an organic light-emitting display device and an electrophoretic display device.

The display panel 110 includes a display area 110A defined by a plurality of pixels PX, and a non-display area 110B in which various signal lines or pads are formed. In the display area 110A of the display panel 110, the plurality of pixels PX defined by a plurality of data lines DL and a plurality of gate lines GL are disposed. Each of the plurality of pixels PX is a component that displays an image by generating light. One pixel PX includes a plurality of sub-pixels, and each of the sub-pixels includes a transistor connected to the gate line GL and/or the data line DL and a pixel circuit operating in response to a gate signal and a data signal that are supplied by the transistor. The pixel PX can be implemented in a liquid-crystal display panel including a liquid-crystal element or an organic light-emitting display panel including an organic light-emitting element according to the configuration of the pixel circuit.

The plurality of data lines DL and the plurality of gate lines GL extending in different directions and intersecting each other are disposed in the display area 110A and the non-display area 110B of the display panel 110. The plurality of data lines DL are lines for transmitting the data signal to the plurality of pixels PX, and the plurality of gate lines GL are lines for transmitting the gate signal to the plurality of pixels PX.

Meanwhile, a period during which all of the sub-pixels arranged in a column direction in the display area 110A are driven is referred to as one frame period. The one frame period can be divided into a scan period in which data is addressed to the sub-pixels from each of the gate lines GL connected to the sub-pixels to write data of an input image to each of the sub-pixels and a light emission period in which the sub-pixels are repeatedly turned on and off according to an emission signal after the scan period. The scan period can be divided into an initialization period, a sampling period, and a programming period. During the scan period, the driving circuit is initialized, a threshold voltage of a driving transistor is compensated, and a data voltage is charged, and during the light emission period, a light emission operation is performed.

In addition, one vertical period is a period required to write one frame amount of pixel data (i.e., frame data) to all the pixels of a screen, and corresponds to one frame period. One horizontal period 1H is a time required to write pixel data of one line sharing the gate line to the pixels PX of one pixel line, and corresponds to a time obtained by dividing one frame period by the total number of pixel lines.

The data driver 120 converts pixel data of an input image, which is digital data, using a digital-to-analog converter (hereinafter referred to as a "DAC") to generate an analog data voltage Vdata. The DAC receives pixel data, which is digital data, and receives a gamma reference voltage from a gamma voltage generating circuit of the power supply unit. The data driver 120 generates a gamma compensation voltage corresponding to each grayscale of the pixel data with the gamma reference voltage by using a voltage dividing circuit. The DAC of the data driver 120 is disposed in each of channels of the data driver 120. The DAC converts the pixel data into the gamma compensation voltage through an array of switch elements that select voltages corresponding to bits of the pixel data, and outputs the data voltage Vdata. The data voltage Vdata output from each of the channels of the data driver 120 can be supplied to the data lines DL of the display panel 110 or can be transmitted to the demultiplexing unit 130 through an output line DO and supplied to the data lines DL through the demultiplexing unit 130.

The demultiplexing unit 130 includes demultiplexers 131 that time-divide the data voltage Vdata output through the channels of the data driver 120 and distribute the time-divided data voltage Vdata to the plurality of data lines DL. Since the data voltage Vdata can be time-divided and distributed to the plurality of data lines DL through the demultiplexing unit 130, the number of channels of the data driver 120 can be reduced. The demultiplexing unit 130 can be omitted, and in this case, the channels of the data driver 120 are directly connected to the data lines DL.

The gate driver 140 is a component that generates the gate signal transmitted to the plurality of pixels PX. The gate driver 140 receives a plurality of clock signals whose level is shifted from the clock signal input as a transistor-transistor-logic (TTL) level from the timing controller 150. The gate driver 140 can include a shift register. The shift register can be formed in the form of a transistor in the non-display area 110B of the display panel 110 by a gate-in-panel (GIP) method, but the present invention is not limited thereto. The shift register is configured by a plurality of stages that shift and output a scan signal, in response to a clock signal and a driving signal. The plurality of stages included in the shift register sequentially output the gate signal to the plurality of gate lines GL through a plurality of output ends.

The timing controller 150 is a component that transmits a control signal to various components of the display device. The timing controller 150 receives a timing signal such as a vertical synchronization signal, a horizontal synchronization signal, a data enable signal, and a dot clock through a receiving circuit such as a low voltage differential signaling (LVDS) interface or a transition minimized differential signaling (TMDS) interface connected to an image board. The timing controller 150 generates control signals for controlling operation timings of the data driver 120, the gate driver 140, and the demultiplexing unit 130 based on an input timing signal.

The power supply unit can include a charge pump, a regulator, a buck converter, a boost converter, a gamma voltage generating circuit, and the like. The power supply unit adjusts a DC input voltage from a host system to generate power required for driving the data driver 120, the gate driver 140, and the display panel 110. The power supply unit can output DC voltages such as a gamma reference voltage, a gate-off voltage VGH/VEH, a gate-on voltage VGL/VEL, a pixel driving voltage (high potential power voltage) ELVDD, a cathode voltage (low potential power voltage) ELVSS, an initialization voltage Vini, a reference voltage Vref, and the like.

Figure 2A:
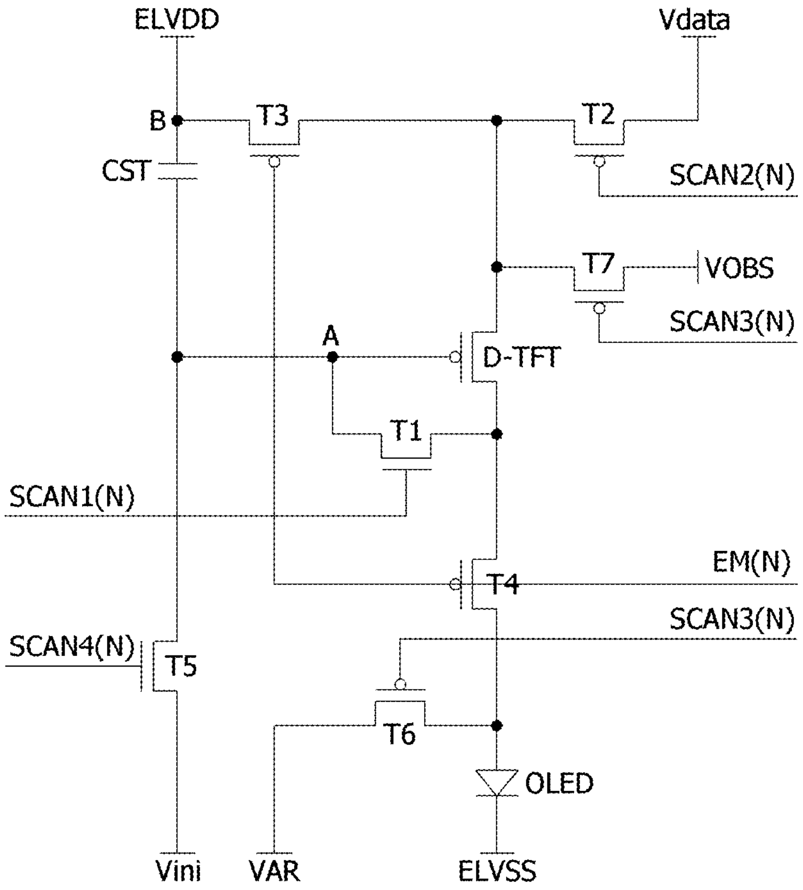
FIGS. 2A and 2B are diagrams illustrating a pixel circuit and a simplified panel structure according to one or more embodiments of the related art, respectively.
Figure 2B:
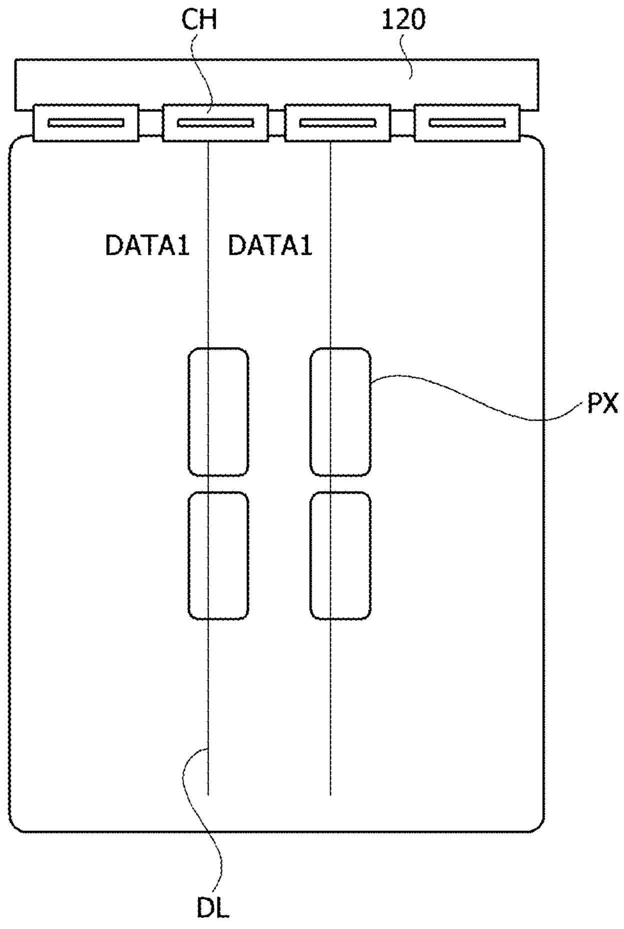

FIGS. 2A and 2B are diagrams illustrating a pixel circuit and a simplified panel structure according to one embodiment of the related art, respectively.

Referring to FIG. 2A, in the conventional internal compensation pixel circuit, during a sampling period, a pixel driving voltage ELVDD is applied to a node B, which is one electrode of a storage capacitor CST connected to a pixel driving voltage line (high potential voltage line) ELVDD, a data voltage is applied to a node A, which is the other electrode of the storage capacitor CST connected to a gate electrode of a driving transistor D-TFT, through one data line Vdata.

In this case, referring to FIG. 2B, the structure of the display panel 110 can be a structure of a 1G1D (one gate line one data line) concept in which one gate line and one data line DL are connected to one pixel PX. Here, the term 1G1D is conceptually used to aid in understanding of the description of the present disclosure, and the description of the present disclosure should not be construed as limiting that only one gate line is connected to one pixel PX. In FIG. 2B, the gate line is omitted to facilitate visual and intuitive understanding compared to the embodiment disclosed in the present disclosure. As described above, a data voltage DATA1 is supplied to the data line DL through a channel CH of the data driver 120.

In the conventional internal compensation pixel structure, in order for the sub-pixel to express a grayscale corresponding to data with a predetermined number of bits (e.g., 8 bits), each of data output channels of the data driver should be able to output data with the predetermined number of bits (i.e., 8 bits). In other words, in order to express 256 different grayscales corresponding to 8-bit digital data with the pixel data, a data voltage corresponding to 8-bit data should be output from the channels of the data driver.

Hereinafter, the pixel circuit capable of reducing the number of bits of data output from the channels of the data driver will be described with reference to the following drawings.

Figure 3A:
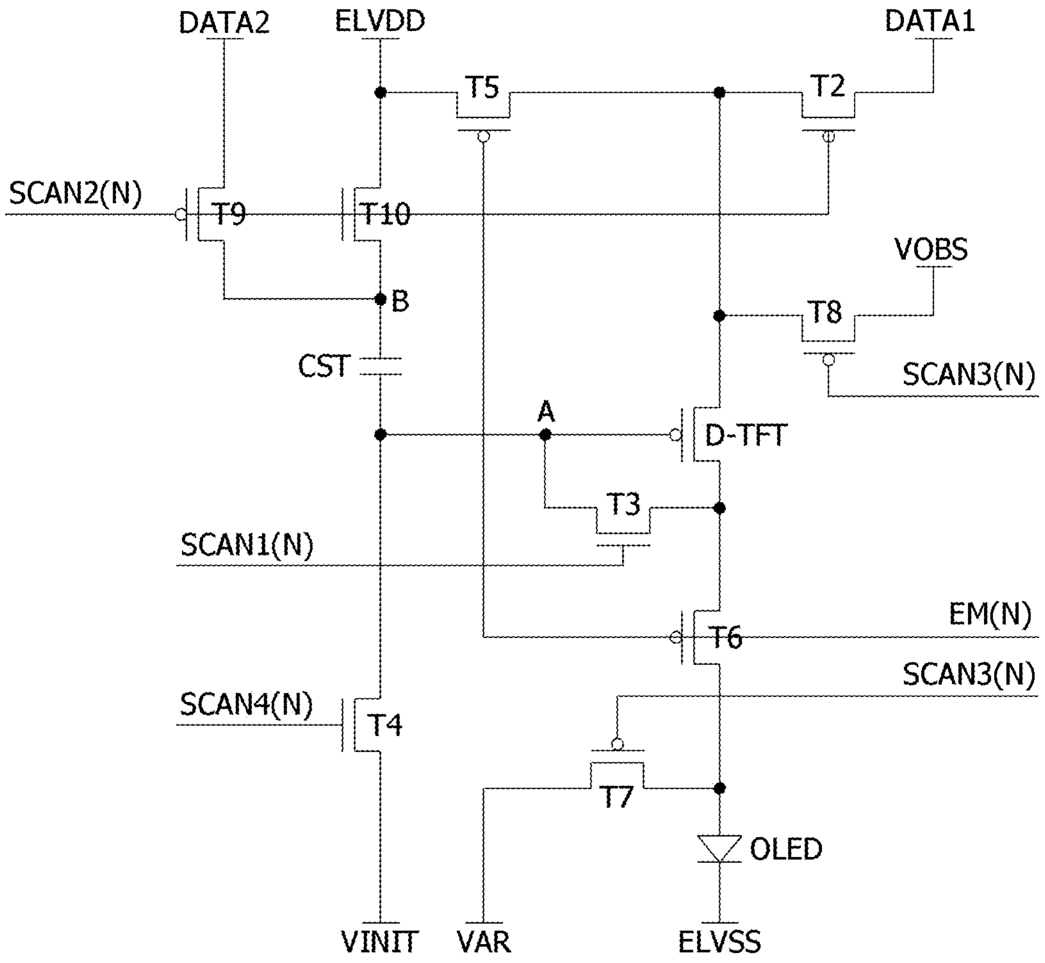
FIGS. 3A and 3B are a circuit diagram of a pixel circuit and a waveform diagram of gate signals according to one or more embodiments of the present disclosure, respectively.
Figure 3B:
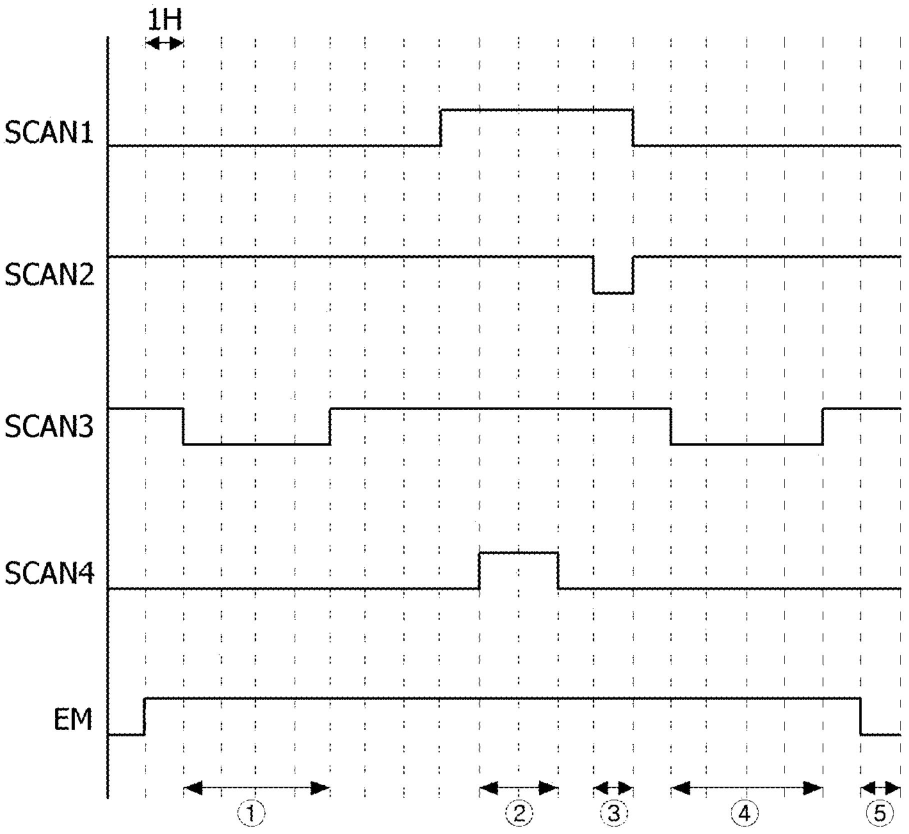

FIGS. 3A and 3B are a circuit diagram of a pixel circuit and a waveform diagram of gate signals according to one embodiment of the present disclosure, respectively.

Referring to FIG. 3A, a pixel circuit (or a pixel driving circuit) for supplying a driving current to a light-emitting element OLED includes a plurality of switch elements T2 to T10 and one capacitor CST. The plurality of switch elements T2 to T10 can be thin-film transistors, and can include p-channel and n-channel transistors.

The pixel circuit according to one embodiment of the present disclosure is an internal compensation circuit capable of compensating a threshold voltage of a driving transistor D-TFT through an internal compensation unit.

Power voltages of a pixel driving voltage ELVDD, a cathode voltage ELVSS, an initialization voltage VINIT, a reset voltage VAR, and a bias stress voltage VOBS are applied to the pixel circuit, and pixel driving signals of a first scan signal SCAN1, a second scan signal SCAN2, a third scan signal SCAN3, a fourth scan signal SCAN4, an emission signal EM, a first data voltage DATA1, and a second data voltage DATA2 are applied to the pixel circuit.

In one embodiment of the present disclosure, the first data voltage DATA1 and the second data voltage DATA2 can be data voltages supplied by dividing a digital data signal, which is pixel data of an input image, to reduce the number of bits of the pixel data and converting the digital data signal into an analog data voltage. In addition, the voltage DATA1 of a first data line can be a data voltage for lower bits of the digital data signal, and the voltage DATA2 of a second data line can be a data voltage for upper bits of the digital data signal. In other words, the digital data signal having a predetermined number of bits is divided into data signals for the upper bits and the lower bits, and an analog-converted data voltage for the lower bits is supplied to the first data line, and an analog-converted data voltage for the upper bits is supplied to the second data line.

Each of the scan signals SCAN1 to SCAN4 and the emission signal EM has an on-level pulse or an off-level pulse at regular time intervals. In one embodiment of the present disclosure, a turn-on voltage of the p-channel transistor can be a gate low voltage, and a turn-off voltage thereof can be a gate high voltage. A turn-on voltage of the n-channel transistor can be a gate high voltage, and a turn-off voltage thereof can be a gate low voltage.

The light-emitting element OLED expresses grayscales of the input image data by emitting light with a current whose amount is adjusted in the driving transistor D-TFT according to a data voltage (DATA2−DATA1), which is a potential difference of two data lines, i.e., a difference of the second data voltage DATA2 and the first data voltage DATA1, charged in the capacitor CST. The light-emitting element OLED can include an anode, a cathode, and an organic compound layer formed between the anode and the cathode. The organic compound layer can include a light-emitting layer, a hole injection layer, a hole transport layer, an electron transport layer, and an electron injection layer, but the present invention is not limited thereto. The anode of the light-emitting element OLED is connected to a driving transistor D-TFT, and the cathode of the light-emitting element OLED is connected to a cathode voltage line (low potential voltage line) to which the cathode voltage ELVSS is applied.

The driving transistor D-TFT is a driving element configured to control a current flowing through the light-emitting element OLED according to a gate-source voltage Vgs. The driving transistor D-TFT includes a gate electrode connected to a node A, and a source electrode and a drain electrode.

The capacitor CST includes two electrodes for forming a capacitance, and the two electrodes are respectively connected to the node A and a node B.

The plurality of switch elements T2 to T10 of the pixel circuit according to one embodiment of the present disclosure can be disposed as follows. A second transistor T2 is controlled by the second scan signal SCAN2 and connects the source electrode of the driving transistor D-TFT to the first data line DATA1. A third transistor T3 is controlled by the first scan signal SCAN1 and connects the gate electrode (i.e., the node A) to the drain electrode of the driving transistor D-TFT. A fourth transistor T4 is controlled by the fourth scan signal SCAN4 and connects the gate electrode (i.e., the node A) of the driving transistor D-TFT to the initialization voltage line VINIT. A fifth transistor T5 is controlled by the emission signal EM and connects the source electrode of the driving transistor D-TFT to the pixel driving voltage line ELVDD. A sixth transistor T6 is controlled by the emission signal EM and connects the drain electrode of the driving transistor D-TFT to the anode of the light-emitting element OLED. A seventh transistor T7 is controlled by the third scan signal SCAN3 and connects the anode of the light-emitting element OLED to the reset voltage line VAR. An eighth transistor T8 is controlled by the third scan signal SCAN3 and connects the source electrode of the driving transistor D-TFT to the bias stress voltage line VOBS. A ninth transistor T9 is controlled by the second scan signal SCAN2 and connects the node B, which is one electrode of the capacitor CST, to the second data line DATA2. A tenth transistor T10 is controlled by the second scan signal SCAN2 and connects the node B, which is one electrode of the capacitor CST, to the pixel driving voltage line ELVDD. In one embodiment of the present disclosure, the driving transistor D-TFT and the second, fifth, sixth, seventh, eighth, and ninth transistors T2, T5, T6, T7, T8, and T9 can be p-channel transistors, and the third, fourth, and tenth transistors T3, T4, and T10 can be n-channel transistors.

An operation of the pixel circuit according to one embodiment of the present disclosure will be described with reference to FIG. 3B by classifying the operation into five time sections. A first section has four horizontal periods (4H), and in the first section, the first scan signal SCAN1 has a low level, the second scan signal SCAN2 has a high level, the third scan signal SCAN3 has a low level, the fourth scan signal SCAN4 has a low level, and the emission signal EM has a high level, and the levels of the third scan signal SCAN3 and the emission signal EM are changed. A second section has two horizontal periods (2H), and in the second section, all of the first to fourth scan signals SCAN1 to SCAN4 and the emission signal EM have a high level, and the levels of the first, third, and fourth scan signals SCAN1, SCAN3, and SCAN4 are changed. A third section has one horizontal period (1H), and in the third section, the first scan signal SCAN1 has a high level, the second scan signal SCAN2 has a low level, the third scan signal SCAN3 has a high level, the fourth scan signal SCAN4 has a low level, and the emission signal EM has a high level, and the levels of the second and fourth scan signals SCAN2 and SCAN4 are changed. A fourth section has four horizontal periods (4H), and in the fourth section, the first scan signal SCAN1 has a low level, the second scan signal SCAN2 has a high level, the third scan signal SCAN3 has a low level, the fourth scan signal SCAN4 has a low level, and the emission signal EM has a high level, and the levels of the first, second, and third scan signals SCAN1, SCAN2, and SCAN3 are changed. A fifth section has one horizontal period (1H), and in the fifth section, the first scan signal SCAN1 has a low level, the second scan signal SCAN2 has a high level, the third scan signal SCAN3 has a high level, the fourth scan signal SCAN4 has a low level, and the emission signal EM has a low level, and the levels of the third scan signal SCAN3 and the emission signal EM are changed.

It should be noted that the present invention is not limited to the structure of the pixel circuit as described above, and in addition to the structure illustrated in FIG. 3A, the pixel circuit in which internal compensation is performed can be formed in various ways such as in a structure in which a light-emitting element emits light by charging a potential difference between two data lines at both electrodes of a storage capacitor connected to a gate electrode of a driving transistor and adjusting the amount of a current of the driving transistor to correspond to the charged voltage. Hereinafter, a detailed operation method of the pixel circuit of FIG. 3A will be described with reference to FIG. 3B.

FIGS. 4A to 4E are diagrams illustrating the driving of the pixel circuit illustrated in FIG. 3A step by step.

Figure 4A:
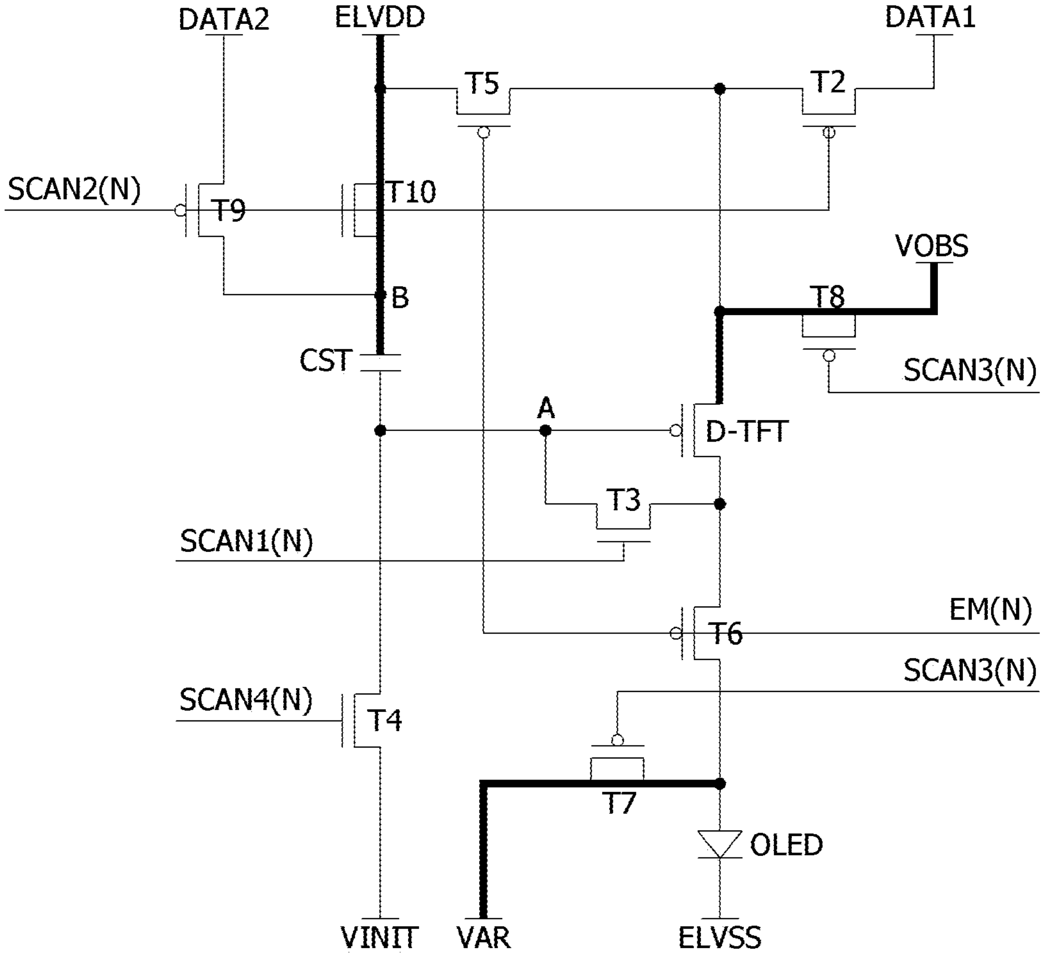
FIGS. 4A to 4E are diagrams illustrating the driving of the pixel circuit illustrated in FIG. 3A step by step.

Referring to FIG. 4A, in the first section, the third scan signal SCAN3 is changed from the high level to the low level, and the emission signal EM is changed from the low level to the high level. The seventh transistor T7 is turned on to electrically connect the reset voltage line VAR to the light-emitting element OLED. Since the reset voltage VAR is a voltage lower than the cathode voltage ELVSS, a current does not flow to the light-emitting element OLED, and thus the light-emitting element OLED does not emit light. The eighth transistor T8 is turned on to electrically connect the source electrode of the driving transistor D-TFT to the bias stress voltage line VOBS. The bias stress voltage VOBS is selected as a voltage level capable of forming a specific condition (on-bias stress) between (Vgs) the gate electrode and the source electrode of the driving transistor D-TFT, so that afterimage visibility due to hysteresis can be minimized. The tenth transistor T10 is turned on to electrically connect the node B, which is one terminal of the capacitor CST, to the pixel driving voltage line ELVDD. In the first section, the gate electrode of the driving transistor D-TFT remains at the same voltage as when the light-emitting element OLED emits light, and the voltage at the gate electrode becomes $Vg=DATA1-DATA2+ELVDD+Vth$.

Figure 4B:
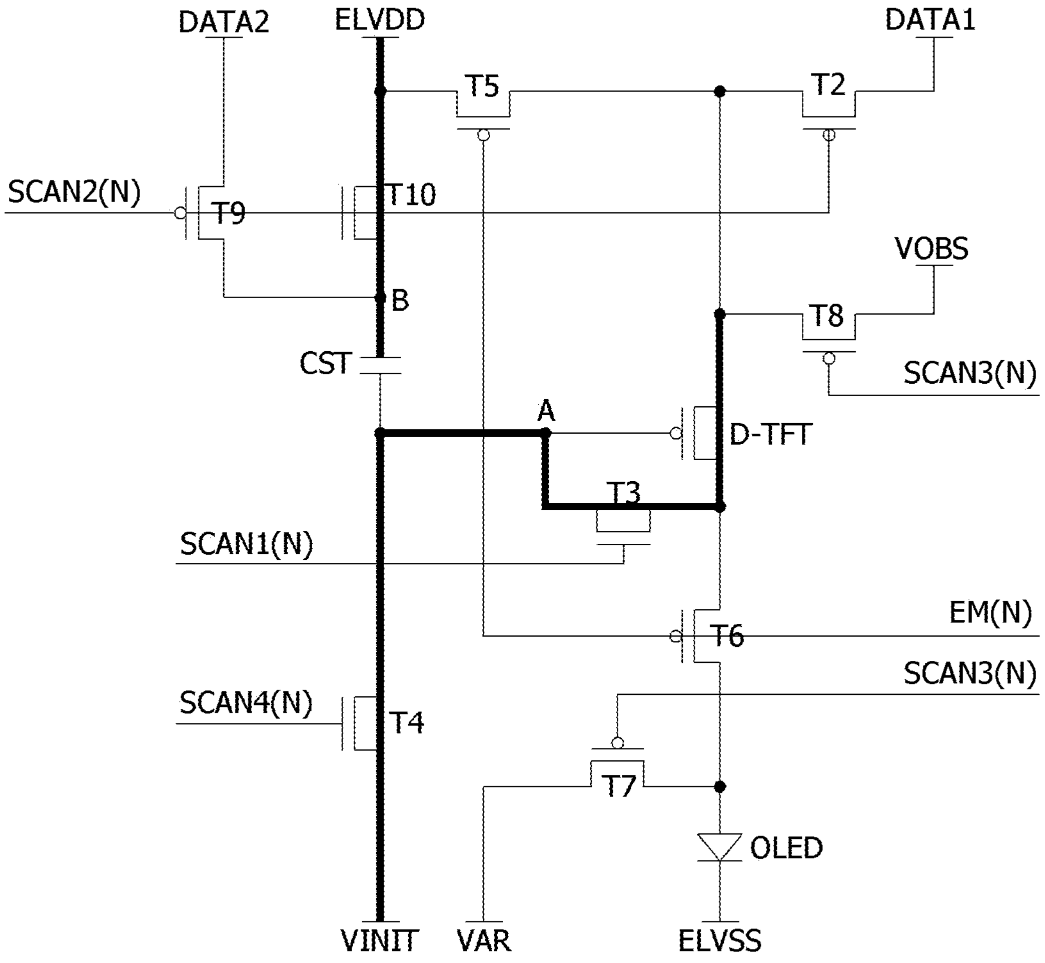

Referring to FIG. 4B, in the second section, all of the first, third, and fourth scan signals SCAN1, SCAN3, and SCAN4 are changed from the low level to the high level. The third and fourth transistors T3 and T4 are turned on, so that the gate electrode of the driving transistor D-TFT is electrically connected to the initialization voltage line Vinit, and the driving transistor D-TFT is turned on. Accordingly, the voltage of the gate electrode of the driving transistor D-TFT is initialized to the initialization voltage VINIT (i.e., Vg=VINIT).

Figure 4C:
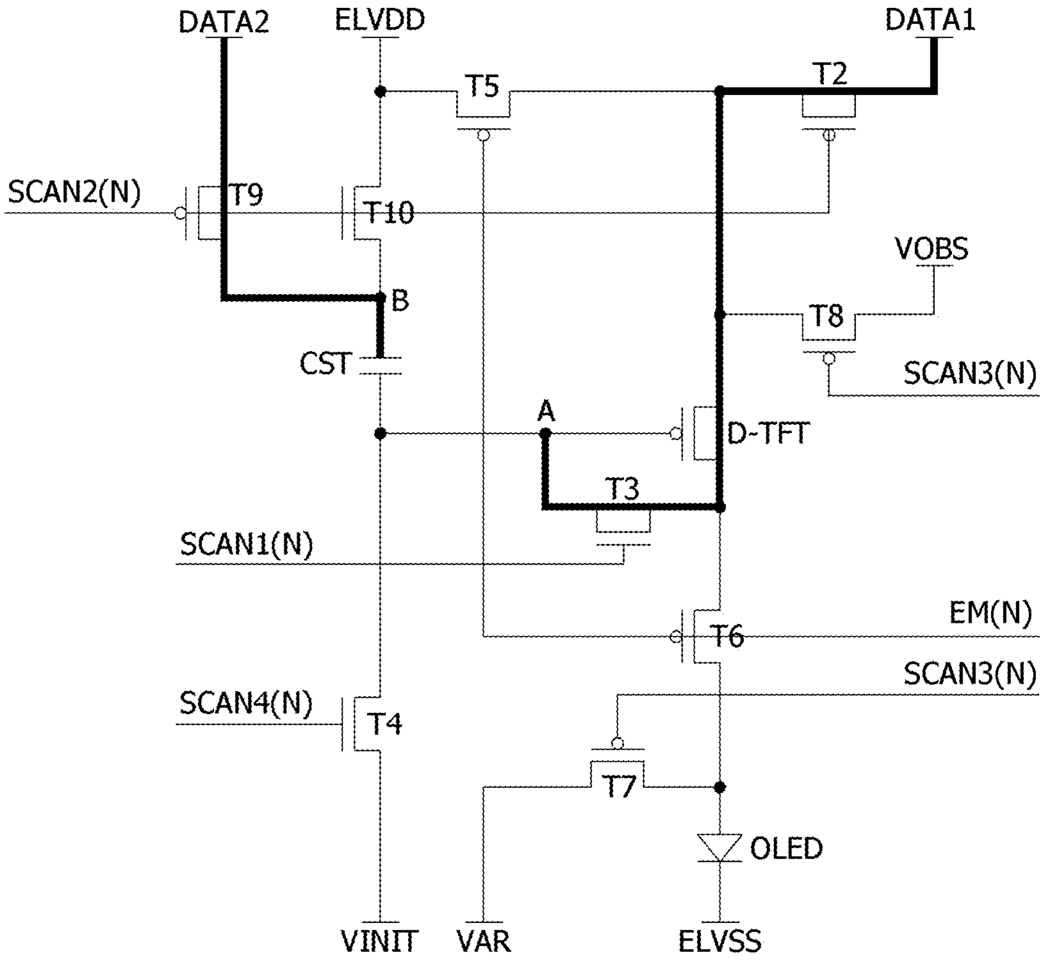

Referring to FIG. 4C, in the third section, the second scan signal SCAN2 and the fourth scan signal SCAN4 are changed from the high level to the low level. The second and third transistors T2 and T3 are turned on to turn on the driving transistor D-TFT, and the gate electrode (node A) of the driving transistor D-TFT is electrically connected to the first data line DATA1. Accordingly, the sum of the first data voltage DATA1 and a threshold voltage Vth of the driving transistor D-TFT is applied to the node A, which is one terminal of the capacitor CST. In addition, the ninth transistor T9 is turned on and the tenth transistor T10 is turned off so that the node B, which is the other terminal of the capacitor CST, is electrically connected to the second data line DATA2, and the second data voltage DATA2 is applied to the node B. Thus, the voltage of the gate electrode of the driving transistor D-TFT becomes Vg=DATA1+Vth.

Figure 4D:
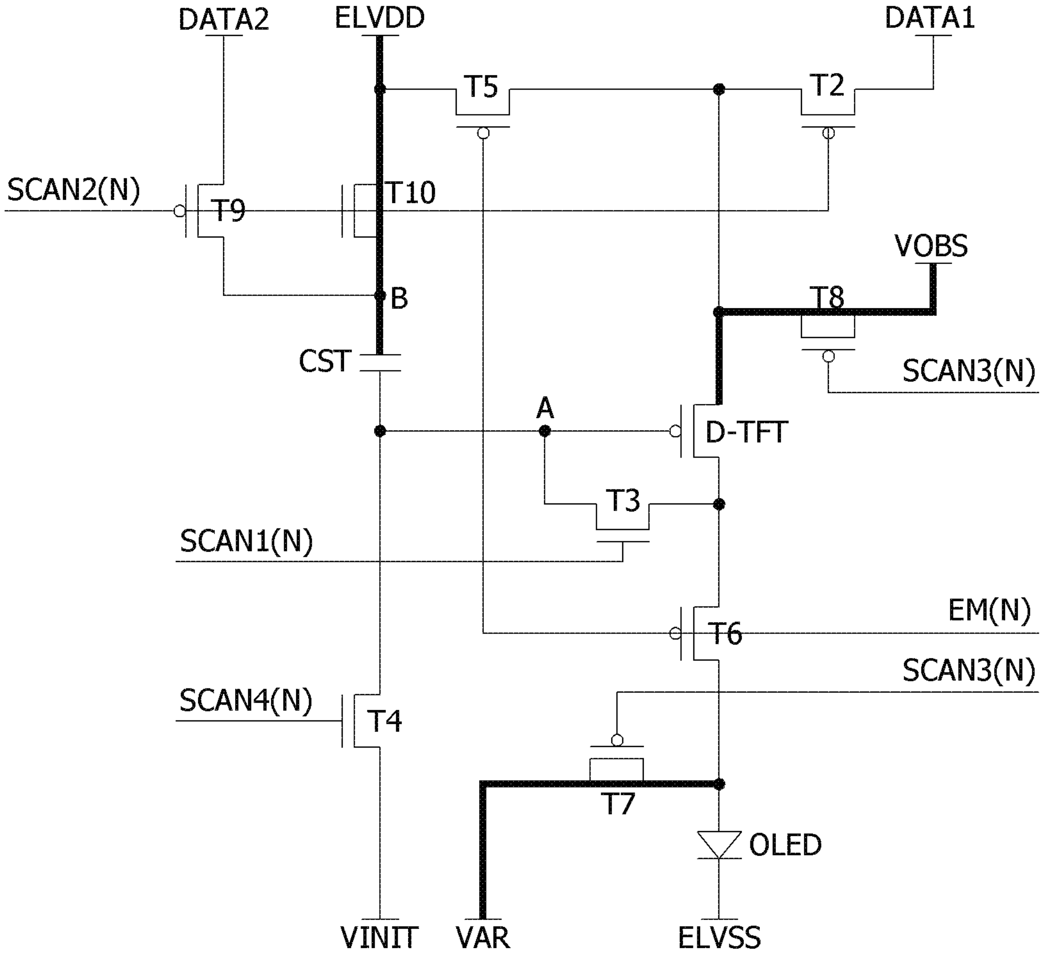

Referring to FIG. 4D, in the fourth section, the first scan signal SCAN1 is changed from the high level to the low level, the second scan signal SCAN2 is changed from the low level to the high level, and the third scan signal SCAN3 is changed from the high level to the low level. The seventh transistor T7 and the eighth transistor T8 are turned on so that the light-emitting element OLED is electrically connected to the reset voltage line VAR, and the bias stress voltage VOBS is applied to the source electrode of the driving transistor D-TFT. The ninth transistor T9 is turned off and the tenth transistor T10 is turned on again so that the pixel driving voltage ELVDD is applied to the node B, which is one terminal of the capacitor CST. In this case, the node A, which is the other terminal of the capacitor CST, is in a floating state, and thus, a voltage change at the node B is reflected to the node A due to the coupling effect of the capacitor CST. Thus, the voltage of the gate electrode of the driving transistor D-TFT becomes Vg=DATA1−DATA2+ELVDD+Vth.

Figure 4E:
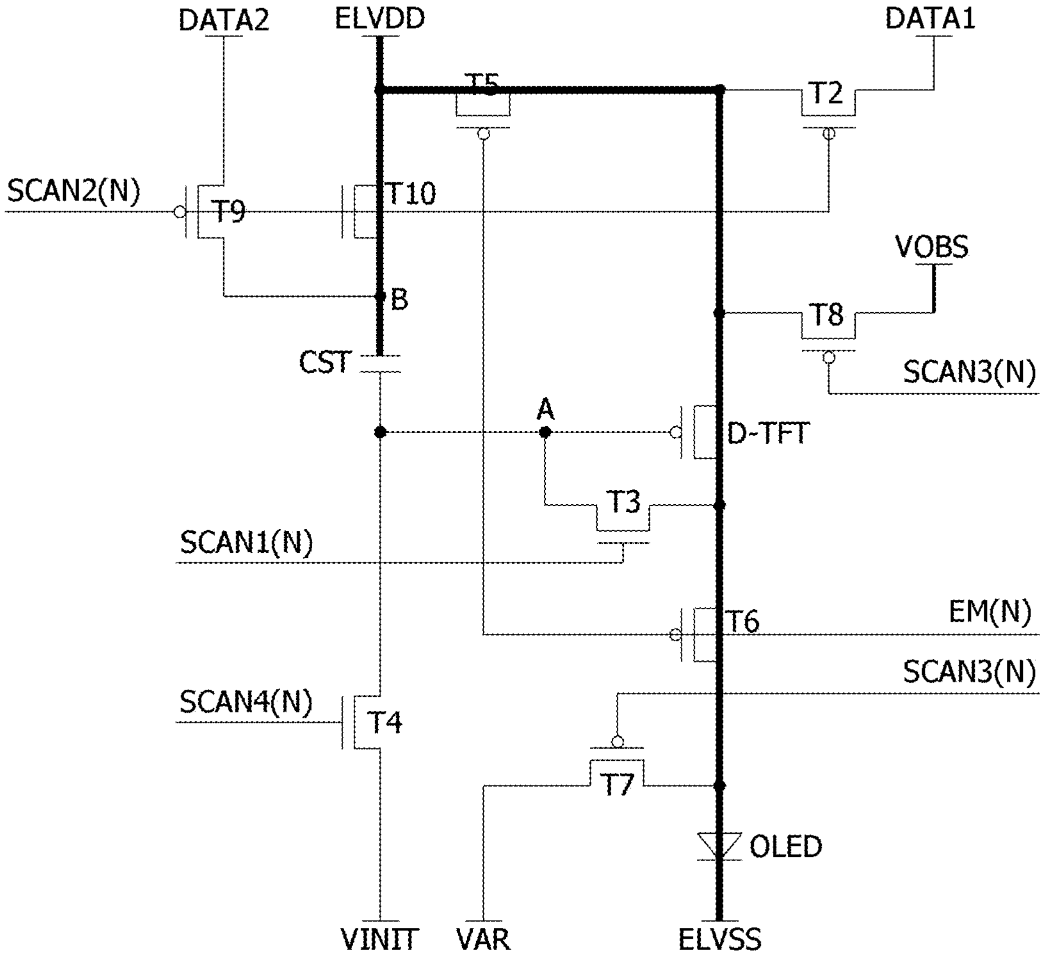

Referring to FIG. 4E, in the fifth section, the third scan signal SCAN3 is changed from the low level to the high level, and the emission signal EM is changed from the high level to the low level. As the fifth and sixth transistors T5 and T6 are turned on, the pixel driving voltage line ELVDD is electrically connected to the source electrode of the driving transistor D-TFT, so that the driving transistor D-TFT is turned on and the driving current is provided to the light-emitting element OLED. The capacitor CST can continuously maintain a constant voltage on the gate electrode of the driving transistor D-TFT while the light-emitting element emits light, thereby providing a constant driving current to the light-emitting element OLED. The voltage of the gate electrode of the driving transistor D-TFT is maintained at Vg=DATA1−DATA2+ELVDD+Vth.

As described above, the operation of one frame period of the pixel circuit according to one embodiment of the present disclosure is that the gate electrode of the driving transistor D-TFT is discharged to the initialization voltage VINIT during the initialization period, the first and second data voltages DATA1 and DATA2 are provided to both terminals of the capacitor CST, respectively, and a potential difference between the two data lines is charged to the capacitor CST during the sampling period, the difference (DATA2−DATA1) between the second data voltage and the first data voltage charged in the capacitor CST is reflected to the voltage of the gate electrode of the driving transistor D-TFT during the programming period, and finally, during the light emission period, a constant driving current is generated in response to a gate electrode voltage of the driving transistor D-TFT, which is maintained constant through the capacitor CST, to allow the light-emitting element OLED to emit light.

Figure 5A:
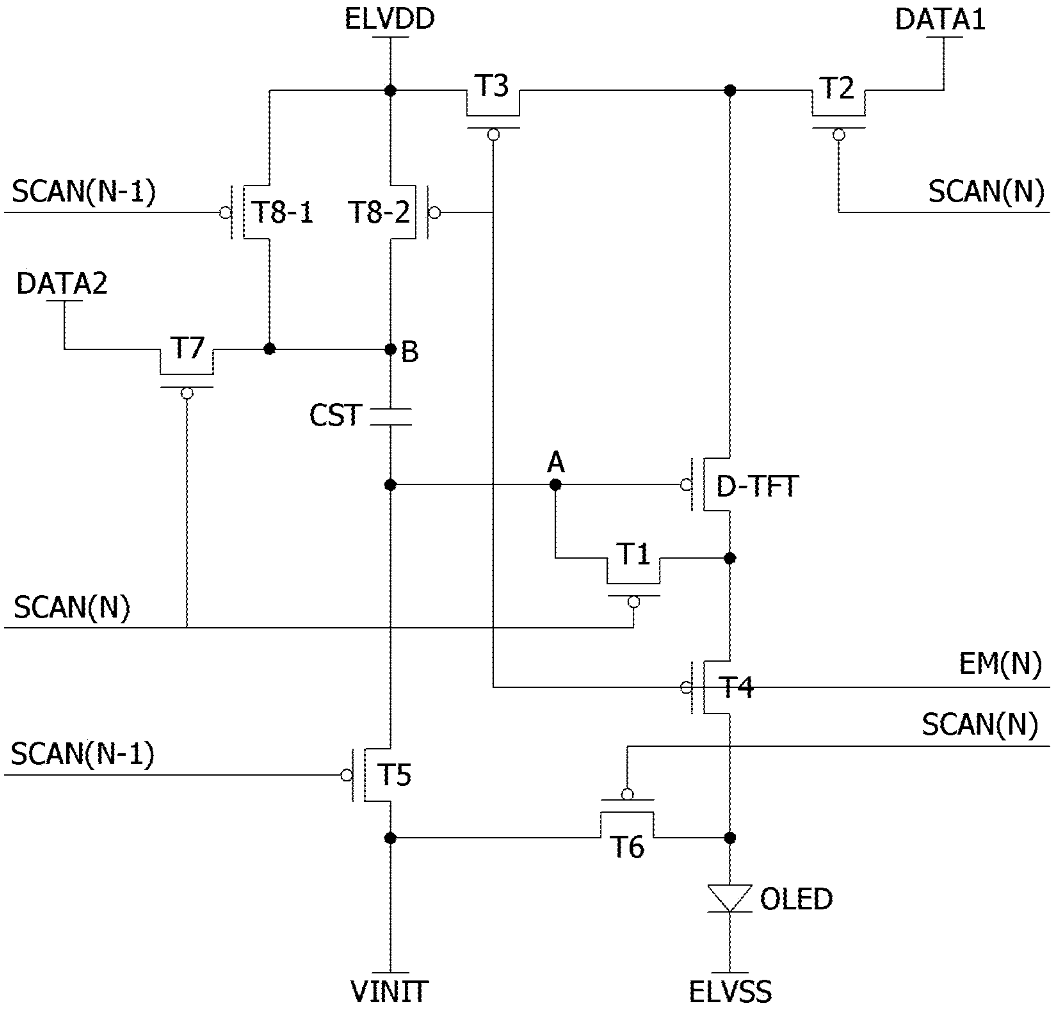
FIGS. 5A and 5B are a circuit diagram of a pixel circuit and a waveform diagram of gate signals according to another embodiment of the present disclosure, respectively.
Figure 5B:
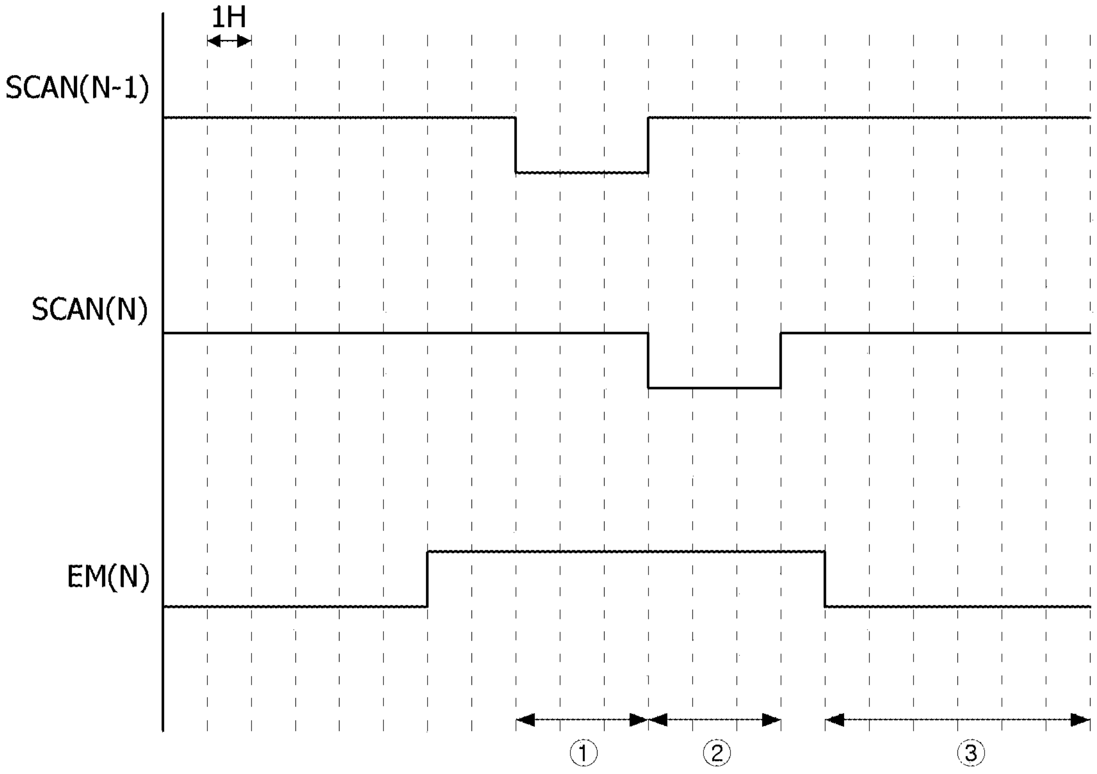

FIGS. 5A and 5B are a circuit diagram of a pixel circuit and a waveform diagram of gate signals according to another embodiment of the present disclosure, respectively.

Referring to FIG. 5A, a pixel circuit (or a pixel driving circuit) for supplying a driving current to a light-emitting element OLED includes a plurality of switch elements T1 to T7, T8-1, and T8-2 and one capacitor CST. The plurality of switch elements T1 to T7, T8-1, and T8-2 can be thin-film transistors and can be p-channel transistors.

The pixel circuit according to another embodiment of the present disclosure is an internal compensation circuit capable of compensating a threshold voltage of a driving transistor D-TFT through an internal compensation unit.

Power voltages of a pixel driving voltage ELVDD, a cathode voltage ELVSS, and an initialization voltage VINIT are applied to the pixel circuit, and pixel driving signals of a first scan signal SCAN(N−1), a second scan signal SCAN (N), an emission signal EM (N), a first data voltage DATA1, and a second data voltage DATA2 are applied to the pixel circuit.

In another embodiment of the present disclosure, the first data voltage DATA1 and the second data voltage DATA2 can be data voltages supplied by dividing a digital data signal, which is pixel data of an input image, to reduce the number of bits of the pixel data and converting the digital data signal into an analog data voltage. In addition, the voltage DATA1 of a first data line can be a data voltage for lower bits of the digital data signal, and the voltage DATA2 of a second data line can be a data voltage for upper bits of the digital data signal. In other words, the digital data signal having a predetermined number of bits is divided into data signals for the upper bits and the lower bits, and an analog-converted data voltage for the lower bits is supplied to the first data line, and an analog-converted data voltage for the upper bits is supplied to the second data line.

Each of the scan signals SCAN(N−1) and SCAN(N) and the emission signal EM (N) has an on-level pulse or an off-level pulse at regular time intervals. In one embodiment of the present disclosure, a turn-on voltage of the p-channel transistor can be a gate low voltage, and a turn-off voltage thereof can be a gate high voltage.

The light-emitting element OLED expresses grayscales of the input image data by emitting light with a current whose amount is adjusted in the driving transistor D-TFT according to a data voltage (DATA2−DATA1), which is a potential difference of two data lines, i.e., a difference of the second data voltage DATA2 and the first data voltage DATA1, charged in the capacitor CST. The light-emitting element OLED can include an anode, a cathode, and an organic compound layer formed between the anode and the cathode. The organic compound layer can include a light-emitting layer, a hole injection layer, a hole transport layer, an electron transport layer, and an electron injection layer, but the present invention is not limited thereto. The anode of the light-emitting element OLED is connected to the driving transistor D-TFT through the switch element, and the cathode of the light-emitting element OLED is connected to a cathode voltage line (low potential voltage line) to which the cathode voltage ELVSS is applied.

The driving transistor D-TFT is a driving element configured to control a current flowing through the light-emitting element OLED according to a gate-source voltage Vgs. The driving transistor D-TFT includes a gate electrode connected to a node A, and a source electrode and a drain electrode.

The capacitor CST includes two electrodes for forming a capacitance, and the two electrodes are respectively connected to the node A and a node B.

The plurality of switch elements T1 to T7, T8-1, and T8-2 of the pixel circuit according to another embodiment of the present disclosure can be disposed as follows. A first transistor T1 is controlled by the second scan signal SCAN(N) and connects the gate electrode (node A) to the drain electrode of the driving transistor D-TFT. A second transistor T2 is controlled by the second scan signal SCAN(N) and connects the source electrode of the driving transistor D-TFT to the first data line DATA1. A third transistor T3 is controlled by the emission signal EM (N) and connects the source electrode of the driving transistor D-TFT to the pixel driving voltage line ELVDD. A fourth transistor T4 is controlled by the emission signal EM (N) and connects the drain electrode of the driving transistor D-TFT to the anode of the light-emitting element OLED. A fifth transistor T5 is controlled by the first scan signal SCAN(N−1) and connects the gate electrode (node A) of the driving transistor D-TFT to the initialization voltage line VINIT. A sixth transistor T6 is controlled by the second scan signal SCAN(N) and connects the anode of the light-emitting element OLED to the initialization voltage line VINIT. A seventh transistor T7 is controlled by the second scan signal SCAN(N) and connects the node B, which is one electrode of the capacitor CST, to the second data line DATA2. An 8-1 transistor T8-1 is controlled by the first scan signal SCAN(N−1) and connects the node B, which is one electrode of the capacitor CST, to the pixel driving voltage line ELVDD. An 8-2 transistor T8-2 is controlled by the emission signal EM (N) and connects the node B, which is one electrode of the capacitor CST, to the pixel driving voltage line ELVDD. In one embodiment of the present disclosure, the plurality of switch elements T1 to T7, T8-1, and T8-2 can be p-channel transistors as described above.

An operation of the pixel circuit according to another embodiment of the present disclosure will be described with reference to FIG. 5B by classifying the operation into three time sections. A first section has three horizontal periods (3H), and in the first section, the first scan signal SCAN(N−1) has a low level, the second scan signal SCAN(N) has a high level, and the emission signal EM (N) has a high level, and the levels of the first scan signal SCAN(N−1) and the emission signal EM (N) are changed. A second section has three horizontal periods (3H), and in the second section, the first scan signal SCAN(N−1) has a high level, the second scan signal SCAN(N) has a low level, and the emission signal EM (N) has a high level, and the levels of the first and second scan signals SCAN(N−1) and SCAN(N) are changed. A third section has six horizontal periods (6H), and in the third section, the first scan signal SCAN1 has a high level, the second scan signal SCAN2 has a high level, and the third scan signal SCAN3 has a low level, and the levels of the second scan signal SCAN2 and the emission signal EM (N) are changed.

It should be noted that, the present invention is not limited to the structure of the pixel circuit as described above with reference to FIGS. 3A and 3B, and in addition to the structure illustrated in FIG. 5A, the pixel circuit in which internal compensation is performed can be formed in various ways such as in a structure in which a light-emitting element emits light by charging a potential difference between two data lines at both electrodes of a storage capacitor connected to a gate electrode of a driving transistor and adjusting the amount of a current of the driving transistor to correspond to the charged voltage. Hereinafter, a detailed operation method of the pixel circuit of FIG. 5A will be described with reference to FIG. 5B.

Figure 6A:
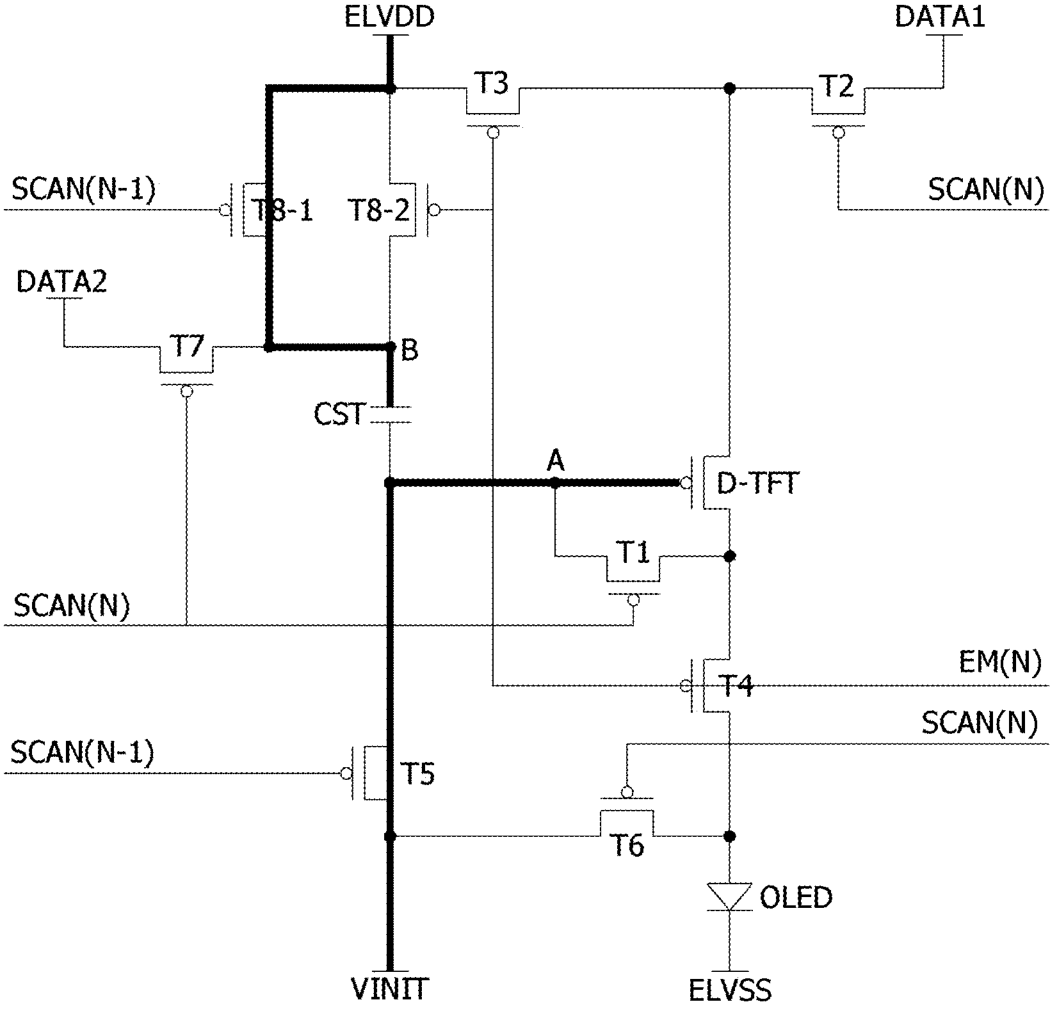
FIGS. 6A to 6C are diagrams illustrating the driving of the pixel circuit illustrated in FIG. 5A step by step.
Figure 6B:
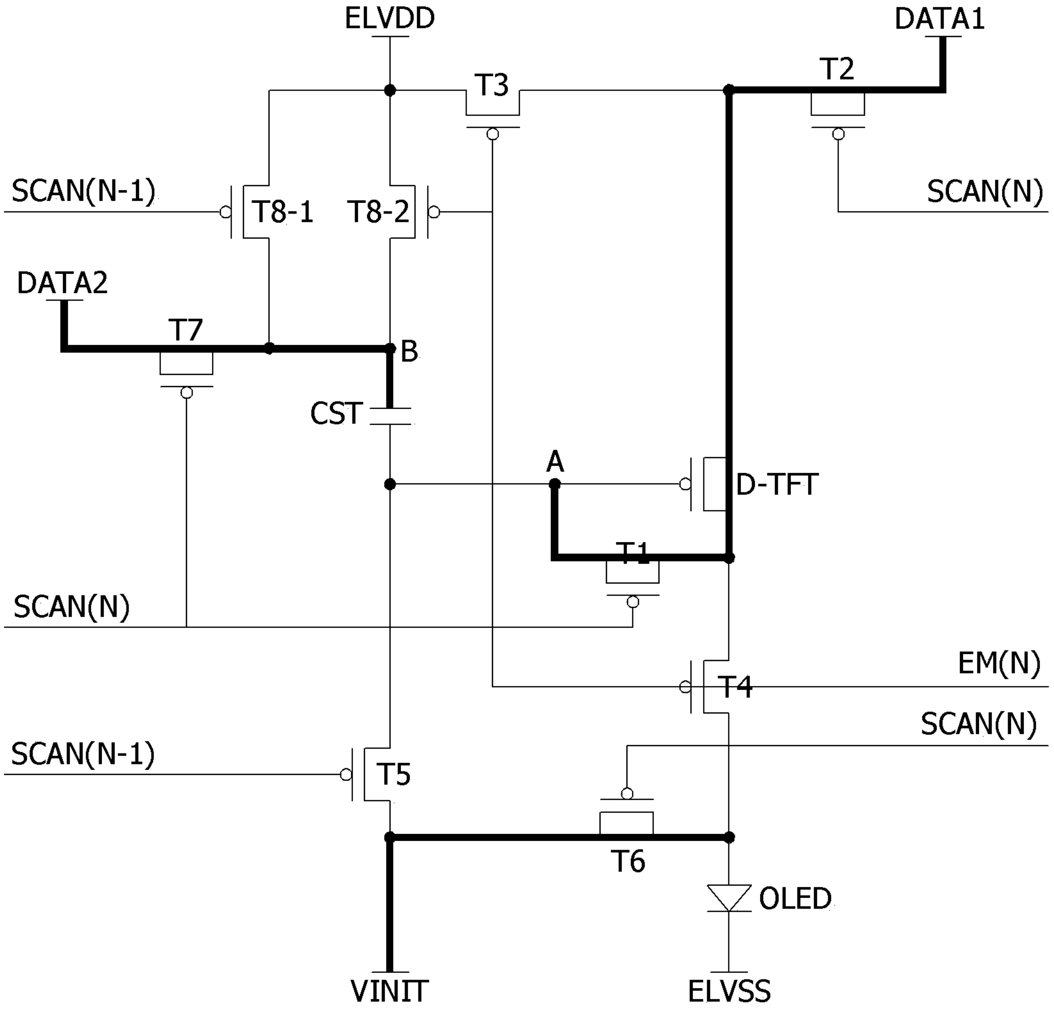
Figure 6C:
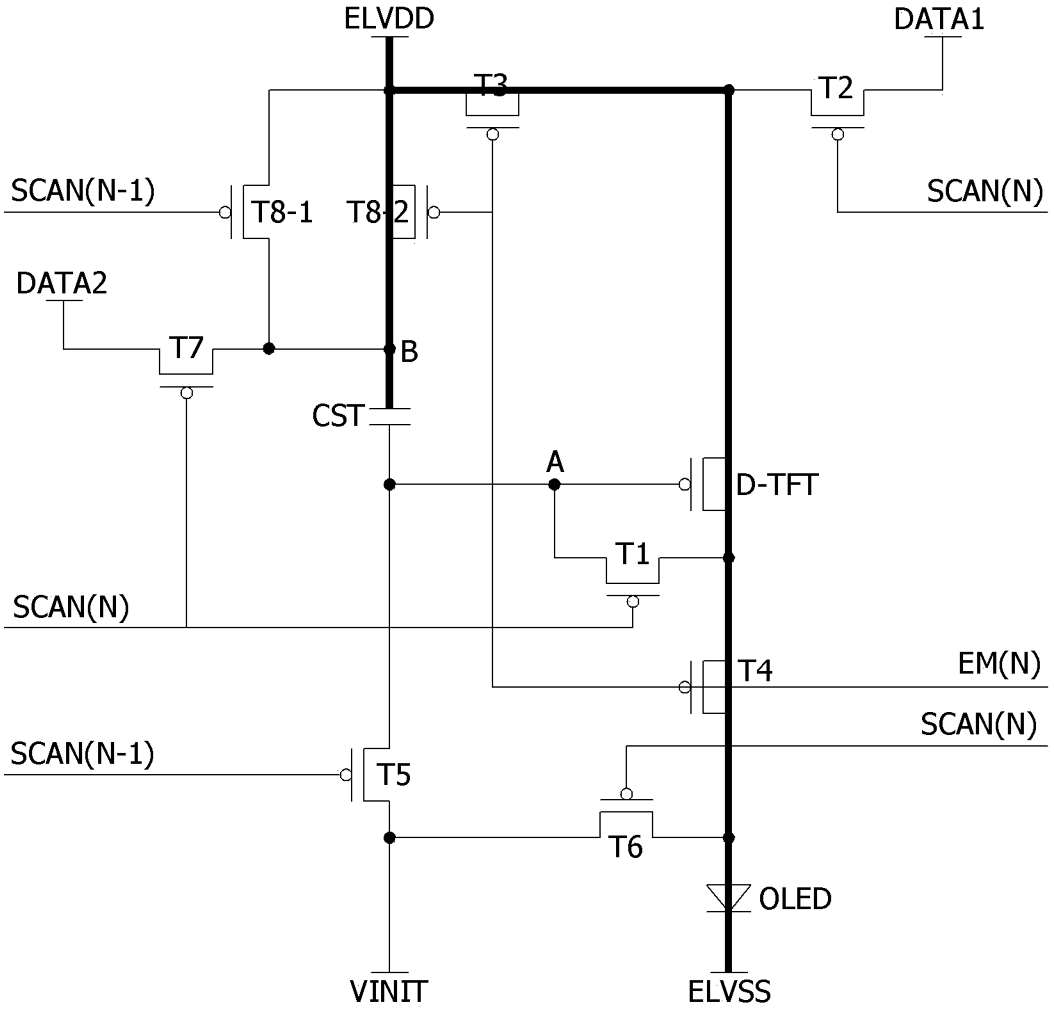

FIGS. 6A to 6C are diagrams illustrating the driving of the pixel circuit illustrated in FIG. 5A step by step.

Referring to FIG. 6A, in the first section, the first scan signal SCAN(N−1) is changed from the high level to the low level, and the emission signal EM (N) is changed from the low level to the high level. The fifth transistor T5 is turned on to electrically connect the gate electrode (node A) of the driving transistor D-TFT to the initialization voltage line VINIT so that the voltage of the gate electrode of the driving transistor D-TFT is initialized to the initialization voltage VINIT (i.e., Vg=VINIT). The 8-1 transistor is turned on to electrically connect the node B, which is one electrode of the capacitor CST, to the pixel driving voltage line ELVDD.

Referring to FIG. 6B, in the second section, the first scan signal SCAN(N−1) is changed from the low level to the high level, and the second scan signal SCAN(N) is changed from the high level to the low level. The first and second transistors T1 and T2 are turned on to turn on the driving transistor D-TFT, and the gate electrode (node A) of the driving transistor D-TFT is electrically connected to the first data line DATA1. Accordingly, the sum of the first data voltage DATA1 and a threshold voltage Vth of the driving transistor D-TFT is applied to the node A, which is one terminal of the capacitor CST. Meanwhile, the sixth transistor T6 is turned on to electrically connect the initialization voltage line VINIT to the light-emitting element OLED. Since the initialization voltage VINIT is a voltage lower than the cathode voltage ELVSS, a current does not flow to the light-emitting element OLED, and thus the light-emitting element OLED does not emit light. In addition, the seventh transistor T7 is turned on and the 8-1 and 8-2 transistors T8-1 and T8-2 are turned off so that the node B, which is the other terminal of the capacitor CST, is electrically connected to the second data line DATA2, and the second data voltage DATA2 is applied to the node B. Thus, the voltage of the gate electrode of the driving transistor D-TFT becomes Vg=DATA1+Vth.

Referring to FIG. 6C, in the third section, the second scan signal SCAN(N) is changed from the low level to the high level, and the emission signal EM (N) is changed from the high level to the low level. As the 8-2 transistor T8-2 is turned on, a voltage change at the node B is reflected to the node A due to the coupling effect of the capacitor CST, and the third and fourth transistors T3 and T4 are turned on, and thus, the pixel driving voltage line ELVDD is electrically connected to the source electrode of the driving transistor D-TFT, so that the driving transistor D-TFT is turned on and the driving current is provided to the light-emitting element OLED. The capacitor CST can continuously maintain a constant voltage on the gate electrode of the driving transistor D-TFT while the light-emitting element emits light, thereby providing a constant driving current to the light-emitting element OLED. The voltage of the gate electrode of the driving transistor D-TFT becomes Vg=DATA1−DATA2+ELVDD+Vth.

As described above, the operation of the one frame period of the pixel circuit according to another embodiment of the present disclosure is that the gate electrode of the driving transistor D-TFT is discharged to the initialization voltage VINIT during the initialization period, the first and second data voltages DATA1 and DATA2 are provided to both terminals of the capacitor CST, respectively, and a potential difference between the two data lines is charged to the capacitor CST during the sampling period, the difference (DATA2−DATA1) between the second data voltage and the first data voltage charged in the capacitor CST is reflected to the voltage of the gate electrode of the driving transistor D-TFT during the programming period, and finally, during the light emission period, a constant driving current is generated in response to a gate electrode voltage of the driving transistor D-TFT, which is maintained constant through the capacitor CST, to allow the light-emitting element OLED to emit light.

Hereinafter, a panel structure of a display device for implementing the pixel circuit capable of reducing the number of bits of data output from the channels of the data driver described above will be described.

Figure 7:
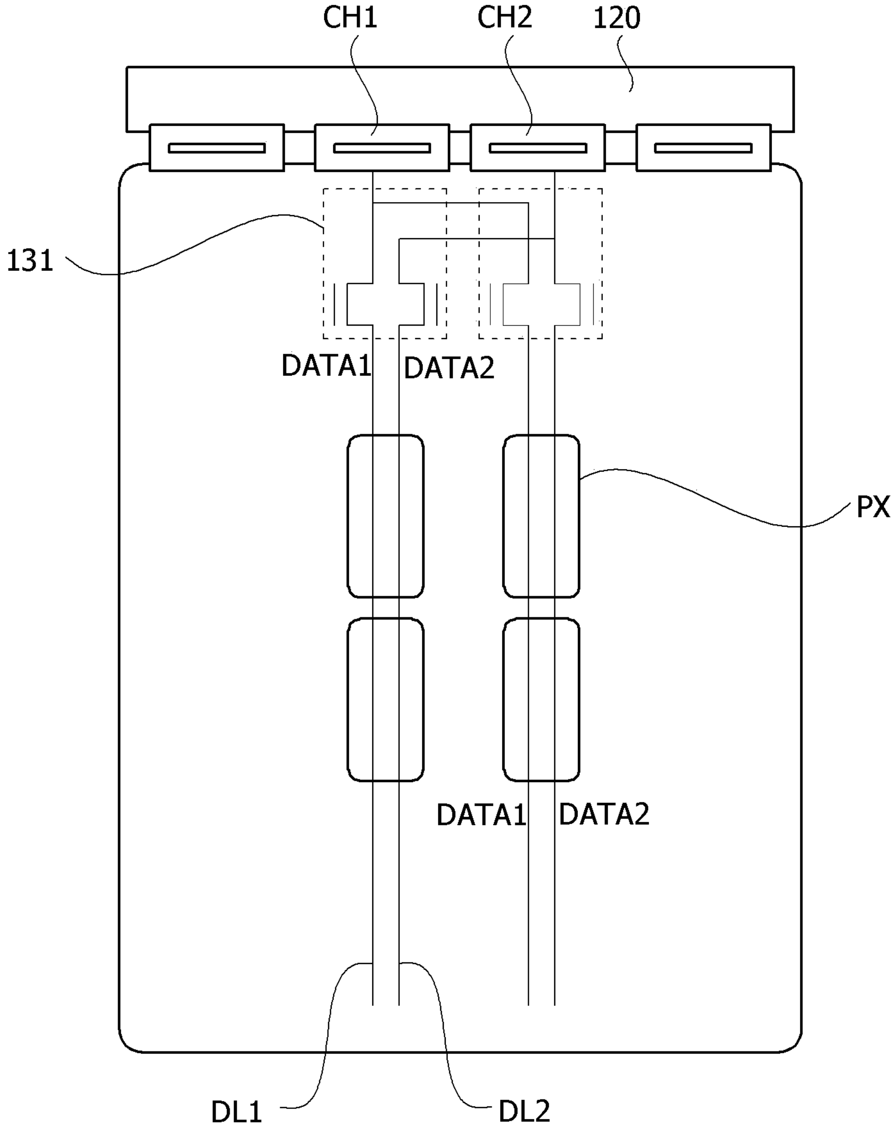
FIG. 7 is a diagram illustrating a simplified panel structure according to one or more embodiments of the present disclosure.

FIG. 7 is a diagram illustrating a simplified panel structure according to one embodiment of the present disclosure.

Referring to FIG. 7, the structure of the display panel 110 according to one embodiment of the present disclosure can be a structure of a 1G2D (one gate line two data line) concept in which one gate line and two data lines DL1 and DL2 are connected to one pixel PX. Here, the term 1G2D is conceptually used to aid in understanding of the description of the present disclosure, and the description of the present disclosure should not be construed as limiting that only one gate line is connected to one pixel PX. In FIG. 7, the gate line is omitted to facilitate visual and intuitive understanding compared to the panel structure of the related art illustrated in FIG. 2B.

The data driver 120 can divide the digital data signal, which is pixel data of an input image, and provide the digital data signal, in which the number of bits of the pixel data is reduced, to channels CH1 and CH2 of the data driver 120. As described above, the DAC of the data driver 120 is disposed in each of the channels of the data driver 120 to output the data voltages DATA1 and DATA2 to correspond to the number of bits of the pixel data, and the output data voltages DATA1 and DATA2 can be supplied to the data lines DL1 and DL2 of the display panel 110 or transmitted to the demultiplexing unit 130 to be supplied to the data lines DL1 and DL2 through the demultiplexers 131.

In one embodiment of the present disclosure, two data lines DL1 and DL2 connected to each of the sub-pixels in the pixel PX include the data line DL1 and the data line DL2, wherein the data voltages DATA1 and DATA2 obtained by dividing the digital data signal, which is pixel data, and converting the divided digital data signal into an analog signal are respectively supplied to the data line DL1 through one channel CH1 of the data driver 120, and to the data line DL2 through the other channel CH2 of the data driver 120 after being distributed by the demultiplexer 131 of the demultiplexing unit 130. This can be equally applied to the pixel PX disposed on the right side in FIG. 7. As an example, in the pixel PX disposed in the right side, a second data line DL2 receives the second data voltage DATA2 through one channel CH2 of the data driver 120, and a first data line DL1 receives the first data voltage DATA1, which is distributed by the demultiplexer 131, through the other channel CH1 of the data driver 120.

As described above, by time-dividing and distributing the data voltage output from one channel of the data driver 120 to a plurality of data lines using the demultiplexing unit 130, two data lines to which different data voltages are supplied can be provided for each pixel even without adding a separate output channel to the data driver 120.

Figure 8:
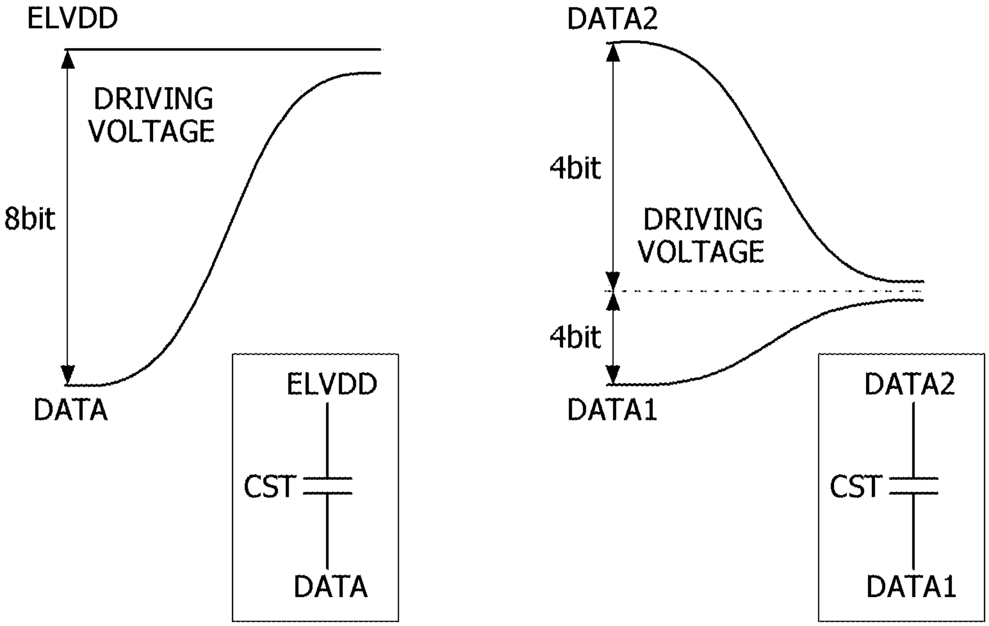
FIGS. 8 and 9 are diagrams illustrating a comparison of data voltage ranges of a related art and an example of the present invention.
Figure 9:
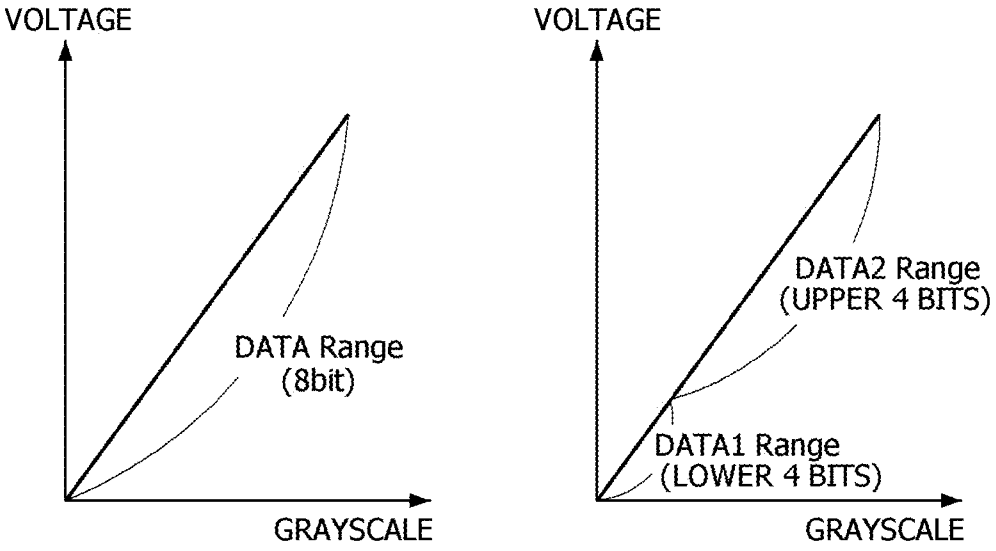

FIGS. 8 and 9 are diagrams illustrating a comparison of data voltage ranges of a related art and an example of the present invention.

Referring to the left diagram of FIG. 8, when an 8-bit digital data signal is used as pixel data of an input image, according to a related art, the structure of the 1G1D (one gate line one data line) concept, in which one gate line and one data line DL are connected to one pixel PX as shown in FIG. 2B, is used as the structure of the display panel 110, and thus light emission grayscales of the light-emitting element are expressed corresponding to a voltage charged by applying the pixel driving voltage ELVDD to one electrode of the capacitor CST of the internal compensation unit of the pixel circuit and applying the data voltage DATA to the other electrode of the capacitor CST.

Referring to the right diagram of FIG. 8, in the pixel circuit and the display device using the same according to another embodiment of the present disclosure, the structure of the 1G2D (one gate line two data line) concept, in which one gate line and two data lines DL1 and DL2 are connected to one pixel PX as shown in FIG. 7, is used as the structure of the display panel 110, and thus light emission grayscales of the light-emitting element are expressed corresponding to a voltage charged in the capacitor CST with a potential difference between the two data lines, which is obtained by applying the second data voltage DATA2 to one electrode of the capacitor CST of the internal compensation unit of the pixel circuit and applying the first data voltage DATA1 to the other electrode of the capacitor CST, so that an 8-bit digital data signal can be expressed by dividing the 8-bit digital data signal into four upper and lower bits.

FIG. 9 is a set of graphs illustrating the relationship between provided data voltages and light emission grayscales of the light-emitting element when using an 8-bit digital data signal as the pixel data of the input image, and referring to this, in the pixel circuit and the display device under the conventional 1G1D concept, the range of data voltages corresponding to 8 bits needs to be supplied from one data line to express grayscales of the light-emitting element as in the left diagram. In the pixel circuit and the display device according to one embodiment of the present disclosure, as shown in the right diagram, by using the structure of the 1G2D concept, it is possible to express grayscales of the light-emitting element for 8-bit data by supplying the range of data voltages corresponding to the upper and lower 4 bits of the data through two data lines.

In summary, according to the related art, in order to express 256 grayscales corresponding to an 8-bit digital data signal for the pixel data of an input image, 8-bit digital data should be converted in the channel of the data driver to output the data voltage.

However, in the pixel circuit and the display device according to one embodiment of the present disclosure, by outputting the data voltages respectively corresponding to the upper and lower 4 bits as shown in the example above, 256 grayscales corresponding to the 8-bit digital data signal can be expressed. Accordingly, in one embodiment of the present disclosure, in order to express 2N types of grayscales corresponding to an N-bit digital data signal (where N is a natural number), which is used as pixel data of an input image, data voltages corresponding to upper N/2 bits and lower N/2 bits can be supplied to two data lines connected to the pixel circuit, respectively, through the channels of the data driver. However, it should be noted that the dividing of the number of bits of the digital data signal is not necessarily limited to half.

As described above, the number of bits of the digital data output from the channels of the data driver can be reduced, so that the size of the DAC used in each channel of the data driver can be reduced, thereby reducing the power consumption of the data driving voltage caused by the generation of a dynamic current of the data driving voltage SVDD.

FIG. 10 is a table illustrating a method of expressing grayscales of the sub-pixel and example data voltage values according to one embodiment of the present disclosure.

Referring to the left table of FIG. 10, in one embodiment of the present disclosure, when grayscales expressed based on 8-bit pixel data are from 0G to 255G, and the grayscales are divided into upper 4-bits and lower 4-bits, second data DATA2 expresses the range of 15G to 255G, and first data DATA1 always expresses the range of 0G to 15G regardless of the type of grayscale to be expressed.

The right table of FIG. 10 is a table illustrating example data voltage values used in the pixel circuit of FIG. 3A. The driving voltages used in the pixel circuit of FIG. 3A can be exemplified as follows. The range of the data voltage is from 1.0 V to 4.0 V, the data driving voltage SVDD is 7.0 V, the pixel driving voltage ELVDD is 2.9 V, the cathode voltage ELVSS is −10.5 V, the reset voltage VAR is −13.0 V, the initialization voltage VINIT is −5.0V, the bias stress voltage VOBS is 3.8 V, the gate-high voltage VGH is 7.0V, and the gate-low voltage VGL is-13.0V. Further, specific numerical values of the data voltage range can be the same as the right table of FIG. 10. For the voltage values corresponding to the grayscales to be expressed, 0G corresponds to 3.55 V and 255G corresponds to 1.00 V, resulting in a voltage difference of 0.01V per grayscale step, and the difference in voltage values for the lower 4 bits, 0.01 V, can represent one grayscale difference, and the difference in voltage values for the upper 4 bits, 0.16V, can represent 16 grayscale steps.

Hereinafter, an effect of reducing the number of bits of data output from the channels of the data driver in the display device according to one embodiment of the present disclosure will be described.

First, the size of the DAC is reduced. In an N-bit DAC, the number of required resistors is $2^N$, and the number of transistors is $2+2^2+2^3+\ldots+2^N$. For example, when a 10-bit digital data signal is to be processed, the number of resistors used in the DAC is 1024, and the number of transistors is 2046.

In the pixel circuit and the display device using the same according to one embodiment of the present disclosure, since the number of bits of data output from the channels of the data driver can be reduced, as an example, an N/2-bit DAC, which is half of the N-bit DAC, can be used, so that when two 5-bit DACs are used instead of a single 10-bit DAC, the number of required resistors becomes 64 and the number of required transistors becomes 124. Accordingly, the size of the DAC can be reduced by about 84%.

In addition, the generation of the power consumption of the data driving voltage SVDD can be reduced. The data driving voltage SVDD can be a power source for supplying power to an analog block in a source driver IC included in the data driver, and can be a power source for supplying power to a gamma amplifier in the source driver IC.

Figure 11:
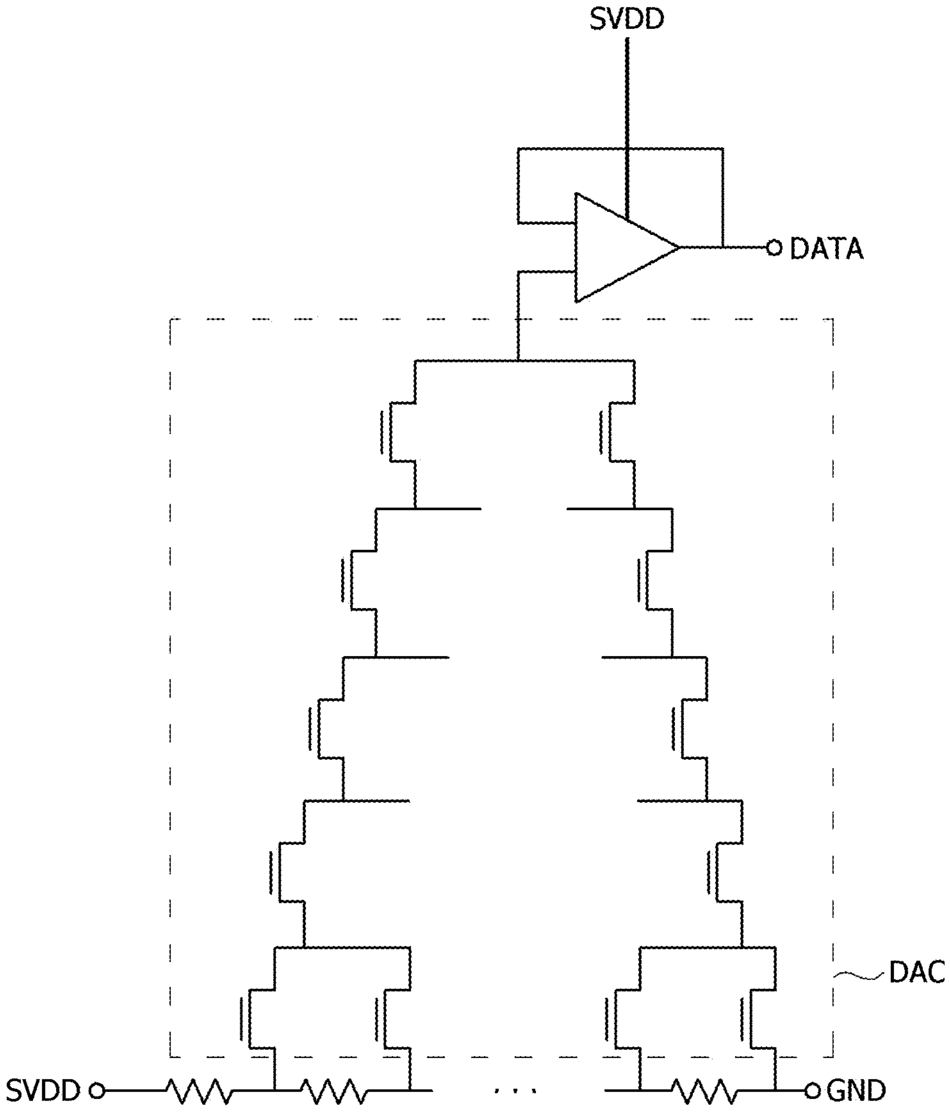
FIG. 11 is a diagram for describing a data driving voltage (SVDD)

FIG. 11 is a diagram for describing the data driving voltage SVDD.

More specifically, referring to FIG. 11, the data driving voltage SVDD according to one embodiment can be a power source supplied to the voltage dividing circuit used by the data driver 120 to generate a gamma compensation voltage corresponding to each of grayscales of pixel data using a gamma reference voltage input from the gamma voltage generating circuit of the power supply unit, or a power source used for an output buffer connected to the DAC disposed on each of the channels of the data driver 120.

In the example described with reference to FIG. 9, in which data voltages corresponding to the upper and lower 4 bits are respectively supplied to two data lines so as to have half the number of bits of the 8-bit pixel data, since the first data voltage constitutes the lower 4 bits, the range of the first data voltage corresponds to 1/16 of the total voltage range excluding the range for the upper 4 bits from the case of 8 bits, and thus, based on the first data voltage, the voltage range can be reduced by one-sixteenth compared to the conventional case using one data line.

Referring to FIG. 2A, a dynamic current of the data driving voltage SVDD is a current flowing through the driving transistor D-TFT, and is generated when the capacitor CST in the pixel circuit is charged from an initial voltage Vini to the sum (Vdata+Vth) of the data voltage and the threshold voltage through one electrode of the capacitor CST at the node A side. In FIG. 2A, since the other electrode of the capacitor at the node B side is fixed at the pixel driving voltage ELVDD, it is necessary to express all grayscales with one data voltage Vdata, for example, grayscales of 0G to 255G should be expressed with 8-bit pixel data. In this case, since the data voltage increases from 255G to 0G, the dynamic current of the data driving voltage SVDD increases.

In the example described with reference to FIG. 3A, in which data voltages corresponding to the upper and lower 4 bits are respectively supplied to two data lines so as to have half the number of bits of the 8-bit pixel data, the second data voltage DATA2 is applied to the electrode of the capacitor CST at the node B side to express the upper 4 bits, and thus, the first data voltage DATA1 needs to express only the lower 4 bits. Referring to the left table of FIG. 10 again, since the first data voltage DATA1 only needs to express 0G to 15G regardless of the type of grayscale to be expressed, the voltage range is reduced to 1/16 compared to the existing case of expressing all 8-bit data. Due thereto, the increase in dynamic current of the data driving voltage SVDD is limited. In the following description, the difference in power consumption of the data driving voltage SVDD when a single data line is connected to the pixel circuit and when dual data lines are connected to the pixel circuit is confirmed through graphs.

Figure 12:
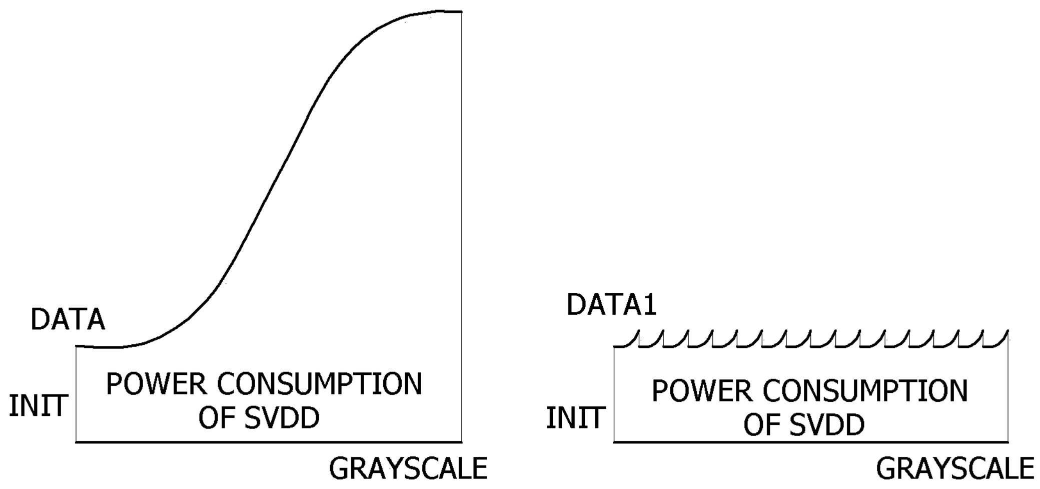
FIG. 12 is a graph comparing the power consumption of the data driving voltage (SVDD) between the related art and an example of the present invention.

FIG. 12 is a graph comparing the power consumption of the data driving voltage SVDD between a related art and an example of the present invention.

Referring to FIG. 3A, a dynamic current of the data driving voltage SVDD is a current flowing through the driving transistor D-TFT, and is generated when the capacitor CST in the pixel circuit is charged from an initial voltage VINIT to the sum (DATA1+Vth) of the first data voltage and the threshold voltage through the one electrode of the capacitor CST at the node A side, and thus, as compared to the power consumption of the data driving voltage SVDD of the conventional case shown in the left graph of FIG. 12, the power consumption of the data driving voltage SVDD is reduced as shown in the right graph of FIG. 12. The power consumption generated in the range of 0G to 15G is equivalent to the conventional case, and the power consumption generated in all other grayscales is reduced.

Finally, according to embodiments of the present disclosure, by applying not only the pixel driving voltage ELVDD but also the data voltage to one electrode of the capacitor of the internal compensation unit, a current-resistance (IR) drop of the pixel driving voltage ELVDD is circuitously canceled in terms of the gate-source voltage Vgs of the driving transistor through the coupling effect of the capacitor. Accordingly, it is possible to prevent the occurrence of poor image quality due to the IR drop phenomenon of the pixel driving voltage ELVDD.

Referring to FIG. 2A, the voltage of the gate electrode (node A) of the driving transistor D-TFT is maintained constant at $Vg=Vdata+Vth$ during the light emission period, so that $Vgs=Vdata+Vth-ELVDD$. When the IR drop of the pixel driving voltage ELVDD is generated, $Vgs=Vdata+Vth-(ELVDD-AV)$, which causes Vgs to fluctuate and result in poor image quality. Here, AV denotes the IR drop of the pixel driving voltage ELVDD.

In one embodiment of the present disclosure illustrated with reference to FIG. 3A, the voltage of the gate electrode (node A) of the driving transistor D-TFT during the light emission period is maintained constant at $Vg=DATA1-DATA2+ELVDD+Vth$, so that $Vgs=(DATA1-DATA2+Vth+ELVDD)-ELVDD$. When the IR drop of the pixel driving voltage ELVDD is generated, $Vgs=DATA1-DATA2+Vth+(ELVDD-\Delta V)-(ELVDD-\Delta V)$, so that the IR drop in the pixel driving voltage ELVDD is canceled out in terms of the gate-to-source voltage of the driving transistor, causing Vgs to remain unchanged.

As described above, in the pixel circuit and the display device using the same according to one embodiment of the present disclosure, by applying a data voltage to both ends of the capacitor of the internal compensation circuit using dual data lines to store a potential difference between the data lines in the capacitor, and allowing the light-emitting element to emit light with a grayscale corresponding to the stored voltage, the number of bits of data output from channels of the data driving circuit can be reduced, thereby reducing the size of the digital-to-analog converter in the data driving circuit, and reducing the generation of the power consumption of the data driving voltage.

A display device according to one embodiment of the present disclosure includes a display panel in which a plurality of data lines and a plurality of gate lines cross each other and pixels are disposed, a data driver configured to convert a digital data signal into an analog data voltage and supply the analog data voltage to the data lines, and a demultiplexing unit configured to distribute the data voltage converted from the digital data signal by the data driver to the data lines, wherein each of the pixels includes sub-pixels each having a pixel circuit, one of the gate lines and two of the data lines are connected to each of the sub-pixels, the two data lines connected to each of the sub-pixels include a data line to which one of voltages obtained by being divided and converted from the digital data signal is supplied through one channel of the data driver, and a data line to which the other one of the voltages is supplied through another channel of the data driver by being distributed by the demultiplexing unit, and the pixel circuit includes a light-emitting element, a driving transistor electrically connected to the light-emitting element through a second electrode thereof to supply a current to the light-emitting element, and controlled by a voltage applied to a gate electrode thereof, a capacitor having a first terminal connected to the gate electrode of the driving transistor, and an internal compensation unit including a plurality of switch elements to sense a threshold voltage of the driving transistor during a sampling period and supply a current, in which the threshold voltage is compensated for, to the light-emitting element, a first data line and a second data line, which are the two data lines connected to each of the sub-pixels, are connected to the internal compensation unit to adjust a light emission grayscale of the light-emitting element based on the number of bits of the digital data signal, wherein the first data line is electrically connected to a first electrode of the driving transistor, and the second data line is electrically connected to a second terminal of the capacitor, a difference between a voltage of the second data line and a voltage of the first data line is charged to a first voltage in the capacitor during the sampling period, and the light-emitting element emits light with a grayscale corresponding to the first voltage.

In the display device according to one embodiment of the present disclosure, the demultiplexing unit includes a demultiplexer connected to one channel of the data driver, configured to receive the converted data voltage from the one channel and time-divisionally distribute the converted data voltage to two or more data lines, the voltages obtained by dividing and converting the digital data signal are data voltages for upper bits and lower bits of the digital data signal, respectively, and the data driver supplies one of the divided and converted voltages to one of the first and second data lines through the demultiplexer, supplies a data voltage for the lower bits to the first data line and supplies a data voltage for the upper bits to the second data line.

According to embodiments of the present disclosure, by applying a data voltage to both ends of a capacitor of an internal compensation unit using two data lines to store a potential difference between the data lines in the capacitor, and allowing a light-emitting element to emit light with a grayscale corresponding to the stored voltage, the number of bits of data output from channels of a data driver can be reduced, thereby reducing the size of a digital-to-analog converter in the data driver.

According to embodiments of the present disclosure, a data range charged in a capacitor of an internal compensation unit through a driving transistor can be reduced according to the reduction of the number of bits of data output from the channels of the data driver, thereby reducing power consumption of a data driving voltage caused by the generation of a dynamic current of a data driving voltage SVDD.

According to embodiments of the present disclosure, by applying not only a pixel driving voltage ELVDD but also a data voltage to one electrode of a capacitor of an internal compensation unit, a current-resistance (IR) drop of a pixel driving voltage ELVDD is circuitously canceled in terms of a gate-source voltage Vgs of a driving transistor through the coupling effect of the capacitor of the internal compensation unit, Accordingly, it is possible to prevent the occurrence of poor image quality due to the IR drop phenomenon of the pixel driving voltage ELVDD.

Effects of the present disclosure are not limited to the above-mentioned effects, and other effects not mentioned will be apparently understood by those skilled in the art from the following description.

While the embodiments of the present invention have been described in detail above with reference to the accompanying drawings, the present invention is not necessarily limited to these embodiments, and various changes and modifications can be made without departing from the technical spirit of the present invention. Accordingly, the embodiments disclosed herein are to be considered descriptive and not restrictive of the technical spirit of the present invention, and the scope of the technical spirit of the present invention is not limited by these embodiments. Accordingly, the above-described embodiments should be understood to be exemplary and not limiting in any aspect. The scope of the present invention should be construed by the appended claims, and all technical spirits within the scopes of their equivalents should be construed as being included in the scope of the present invention.

What is claimed is:

1. A pixel circuit comprising:

a light-emitting element;

a driving transistor electrically connected to the light-emitting element through a second electrode thereof to supply a current to the light-emitting element, and controlled by a voltage applied to a gate electrode thereof;

a capacitor having a first terminal connected to the gate electrode of the driving transistor; and an internal compensation unit including a plurality of switch elements to sense a threshold voltage of the driving transistor during a sampling period, and supply a current, in which the threshold voltage is compensated for, to the light-emitting element, wherein data lines, through which an analog data voltage converted from a digital data signal is supplied, are connected to the internal compensation unit, the digital data signal being configured to adjust a light emission grayscale of the light-emitting element based on a number of bits thereof, wherein the data lines include a first data line and a second data line, the first data line being electrically connected to a first electrode of the driving transistor, and the second data line being electrically connected to a second terminal of the capacitor, and wherein the light-emitting element emits light with a grayscale corresponding to a first voltage by charging a difference between a voltage of the second data line and a voltage of the first data line as the first voltage in the capacitor during the sampling period, wherein the voltage of the first data line is a data voltage for lower bits of the digital data signal, wherein the voltage of the second data line is a data voltage for upper bits of the digital data signal, wherein the number of bits of the digital data signal is an even natural number, and wherein each of a number of the upper bits and a number of the lower bits is half of the number of bits of the digital data signal.

2. The pixel circuit of claim 1, wherein the first voltage charged in the capacitor is applied to the voltage of the gate electrode of the driving transistor during a programming period.

3. The pixel circuit of claim 2, wherein the voltage of the gate electrode, to which the first voltage is applied, of the driving transistor is constantly maintained through the capacitor during a light emission period to generate a constant current for driving the light-emitting element.

4. A pixel circuit comprising:

a light-emitting element;

a driving transistor electrically connected to the light-emitting element through a second electrode thereof to supply a current to the light-emitting element, and controlled by a voltage applied to a gate electrode thereof;

a capacitor having a first terminal connected to the gate electrode of the driving transistor; and an internal compensation unit including a plurality of switch elements to sense a threshold voltage of the driving transistor during a sampling period, and supply a current, in which the threshold voltage is compensated for, to the light-emitting element, wherein data lines, through which an analog data voltage converted from a digital data signal is supplied, are connected to the internal compensation unit, the digital data signal being configured to adjust a light emission grayscale of the light-emitting element based on a number of bits thereof, wherein the data lines include a first data line and a second data line, the first data line being electrically connected to a first electrode of the driving transistor, and the second data line being electrically connected to a second terminal of the capacitor, wherein the light-emitting element emits light with a grayscale corresponding to a first voltage by charging a difference between a voltage of the second data line and a voltage of the first data line as the first voltage in the capacitor during the sampling period, wherein the first data line is electrically connected to the first electrode of the driving transistor through a first switch element, wherein the second data line is electrically connected to the second terminal of the capacitor through a second switch element, wherein the first switch element and the second switch element are controlled by a same scan signal and are turned on during the sampling period, and wherein the second terminal of the capacitor is electrically connected to a pixel driving voltage line through one or more switch elements that are turned off during the sampling period.

5. The pixel circuit of claim 4, wherein the plurality of switch elements are thin-film transistors, wherein each of the one or more switch elements that are turned off during the sampling period is an n-channel transistor that is controlled by the same scan signal that controls the first and second switch elements, and wherein the first and second switch elements are p-channel transistors.

6. The pixel circuit of claim 4, wherein the plurality of switch elements are p-channel thin-film transistors, and wherein the one or more switch elements that are turned off during the sampling period include a switch element controlled by a scan signal and a switch element controlled by an emission signal, which are connected in parallel.

7. A display device comprising:

a display panel in which data lines and gate lines crossing each other are disposed, the display panel including pixels;

a data driver configured to convert a digital data signal into an analog data voltage and supply the analog data voltage to the data lines;

a gate driver configured to supply a gate signal to the gate lines;

a timing controller configured to transmit the digital data signal to the data driver and generate a signal for controlling operation timings of the data driver and the gate driver; and a power supply unit configured to generate voltages for driving the pixels, the data driver, the gate driver, and the timing controller, wherein each of the pixels includes sub-pixels each having a pixel circuit, wherein the pixel circuit includes:

a light-emitting element;

a driving transistor electrically connected to the light-emitting element through a second electrode thereof to supply a current to the light-emitting element, and controlled by a voltage applied to a gate electrode thereof;

a capacitor having a first terminal connected to the gate electrode of the driving transistor; and an internal compensation unit including a plurality of switch elements to sense a threshold voltage of the driving transistor during a sampling period and supply a current, in which the threshold voltage is compensated for, to the light-emitting element, wherein the data lines are connected to the internal compensation unit and adjust a light emission grayscale of the light-emitting element based on a number of bits of the digital data signal, wherein the data lines connected to the internal compensation unit include a first data line and a second data line, the first data line being electrically connected to a first electrode of the driving transistor, and the second data line being electrically connected to a second terminal of the capacitor, wherein the light-emitting element emits light with a grayscale corresponding to a first voltage by charging a difference between a voltage of the second data line and a voltage of the first data line as the first voltage in the capacitor during the sampling period, wherein the voltage of the first data line supplied to the pixel circuit is a data voltage for lower bits of the digital data signal, wherein the voltage of the second data line supplied to the pixel circuit is a data voltage for upper bits of the digital data signal, wherein the number of bits of the digital data signal is an even natural number, and wherein each of a number of the upper bits and a number of the lower bits is half of the number of bits of the digital data signal.

8. The display device of claim 7, wherein the first voltage charged in the capacitor is applied to the voltage of the gate electrode of the driving transistor during a programming period.

9. The display device of claim 8, wherein the voltage of the gate electrode, to which the first voltage is applied, of the driving transistor is constantly maintained through the capacitor during a light emission period to generate a constant current for driving the light-emitting element.

10. The display device of claim 7, further comprising a demultiplexing unit configured to distribute the data voltage converted from the digital data signal by the data driver to the data lines, wherein one of the gate lines and two of the data lines are connected to each of the sub-pixels of the display panel, wherein the two data lines connected to each of the sub-pixels include;

a data line to which one of voltages, obtained by dividing the digital data signal into two parts and converting each, is supplied through one channel of the data driver, and a data line, to which the other one of the voltages is supplied by being provided through another channel of the data driver and being distributed by the demultiplexing unit, and wherein the first and second data lines are the two data lines connected to each of the sub-pixels.

11. A display device comprising:

a display panel in which data lines and gate lines crossing each other are disposed, the display panel including pixels;

a data driver configured to convert a digital data signal into an analog data voltage and supply the analog data voltage to the data lines;

a gate driver configured to supply a gate signal to the gate lines;

a timing controller configured to transmit the digital data signal to the data driver and generate a signal for controlling operation timings of the data driver and the gate driver; and a power supply unit configured to generate voltages for driving the pixels, the data driver, the gate driver, and the timing controller, wherein each of the pixels includes sub-pixels each having a pixel circuit, wherein the pixel circuit includes;

a light-emitting element;

a driving transistor electrically connected to the light-emitting element through a second electrode thereof to supply a current to the light-emitting element, and controlled by a voltage applied to a gate electrode thereof;

a capacitor having a first terminal connected to the gate electrode of the driving transistor; and an internal compensation unit including a plurality of switch elements to sense a threshold voltage of the driving transistor during a sampling period and supply a current, in which the threshold voltage is compensated for, to the light-emitting element, wherein the data lines are connected to the internal compensation unit and adjust a light emission grayscale of the light-emitting element based on a number of bits of the digital data signal, wherein the data lines connected to the internal compensation unit include a first data line and a second data line, the first data line being electrically connected to a first electrode of the driving transistor, and the second data line being electrically connected to a second terminal of the capacitor, wherein the light-emitting element emits light with a grayscale corresponding to a first voltage by charging a difference between a voltage of the second data line and a voltage of the first data line as the first voltage in the capacitor during the sampling period, wherein the first data line is electrically connected to the first electrode of the driving transistor through a first switch element, wherein the second data line is electrically connected to the second terminal of the capacitor through a second switch element, wherein the first switch element and the second switch element are controlled by a same scan signal and are turned on during the sampling period, wherein the power supply unit supplies voltages for driving the pixels to a pixel driving voltage line, and wherein the second terminal of the capacitor is electrically connected to the pixel driving voltage line through one or more switch elements that are turned off during the sampling period.

12. The display device of claim 11, wherein the plurality of switch elements are thin-film transistors, wherein each of the one or more switch elements that are turned off during the sampling period is an n-channel transistor that is controlled by the same scan signal that controls the first and second switch elements, and wherein the first and second switch elements are p-channel transistors.

13. The display device of claim 11, wherein the plurality of switch elements are p-channel thin-film transistors, and wherein the one or more switch elements that are turned off during the sampling period include a switch element controlled by a scan signal and a switch element controlled by an emission signal, which are connected in parallel.

14. A display device comprising:

a display panel in which a plurality of data lines and a plurality of gate lines crossing each other are disposed, the display panel including pixels;

a data driver configured to convert a digital data signal into an analog data voltage and supply the analog data voltage to the data lines; and a demultiplexing unit configured to distribute the data voltage converted from the digital data signal by the data driver to the data lines, wherein each of the pixels includes sub-pixels each having a pixel circuit, wherein one of the gate lines and two of the data lines are connected to each of the sub-pixels, wherein the two data lines connected to each of the sub-pixels include:

a first data line to which one of voltages, obtained by dividing the digital data signal into two parts and converting each, is supplied through one channel of the data driver, and a second data line, to which the other one of the voltages is supplied by being provided through another channel of the data driver and being distributed by the demultiplexing unit, wherein the pixel circuit includes:

a light-emitting element;

a driving transistor electrically connected to the light-emitting element through a second electrode thereof to supply a current to the light-emitting element, and controlled by a voltage applied to a gate electrode thereof;

a capacitor having a first terminal connected to the gate electrode of the driving transistor; and an internal compensation unit including a plurality of switch elements to sense a threshold voltage of the driving transistor during a sampling period and supply a current, in which the threshold voltage is compensated for, to the light-emitting element, wherein the first data line and the second data line, which are data lines connected to each of the sub-pixels, are connected to the internal compensation unit and adjust a light emission grayscale of the light-emitting element based on a number of bits of the digital data signal, the first data line being electrically connected to a first electrode of the driving transistor, and the second data line being electrically connected to a second terminal of the capacitor, wherein the light-emitting element emits light with a grayscale corresponding to a first voltage by charging a difference between a voltage of the second data line and a voltage of the first data line as the first voltage in the capacitor during the sampling period, wherein the first data line is electrically connected to the first electrode of the driving transistor through a first switch element, wherein the second data line is electrically connected to the second terminal of the capacitor through a second switch element, wherein the first switch element and the second switch element are controlled by a same scan signal and are turned on during the sampling period, wherein a power supply unit supplies voltages for driving the pixels to a pixel driving voltage line, and wherein the second terminal of the capacitor is electrically connected to the pixel driving voltage line through one or more switch elements that are turned off during the sampling period.

* * * * *